US009332569B2

(12) United States Patent
Rudolph et al.

(10) Patent No.: US 9,332,569 B2
(45) Date of Patent: May 3, 2016

(54) METHOD AND SYSTEM FOR PROVIDING CHANNEL ASSIGNMENT INFORMATION USED TO SUPPORT UPLINK AND DOWNLINK CHANNELS

(75) Inventors: Marian Rudolph, Montreal (CA);
Stephen G. Dick, Nesconset, NY (US);
Phillip J. Pietraski, Huntington Station, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 13/103,601

(22) Filed: May 9, 2011

(65) Prior Publication Data

US 2011/0205992 A1     Aug. 25, 2011

Related U.S. Application Data

(63) Continuation of application No. 11/709,970, filed on Feb. 23, 2007, now Pat. No. 7,941,151, which is a continuation of application No. 10/902,740, filed on Jul. 29, 2004, now Pat. No. 7,200,405.

(60) Provisional application No. 60/523,049, filed on Nov. 18, 2003.

(51) Int. Cl.
*H04W 4/00* (2009.01)
*H04W 72/14* (2009.01)
*H04L 1/00* (2006.01)
(Continued)

(52) U.S. Cl.
CPC .............. *H04W 72/14* (2013.01); *H04L 1/0046* (2013.01); *H04L 1/0061* (2013.01);
(Continued)

(58) Field of Classification Search
USPC .................. 370/329; 455/450, 451, 452.1
See application file for complete search history.

(56) References Cited

U.S. PATENT DOCUMENTS

| 4,910,736 A | 3/1990 | Tanaka et al. |
| 5,142,539 A | 8/1992 | Dahlin et al. |

(Continued)

FOREIGN PATENT DOCUMENTS

| CA | 2374815 | 12/2000 |
| DE | 19855242 | 5/2000 |

(Continued)

OTHER PUBLICATIONS

Interdigital, "Updated Recommendation for UE-specific CRC", TDOC R1-01-1066, 3GPP TSG RAN WG 1 AD HOC Meeting on HSDPA, (Nov. 2001), available at: http://www.3gpp.org/ftp/tsg_ran/WG1_RL1.

(Continued)

*Primary Examiner* — David Q Nguyen
(74) *Attorney, Agent, or Firm* — Volpe and Koenig, P.C.

(57) ABSTRACT

A method and wireless transmit/receive unit (WTRU) for utilizing channel control information associated with enhanced uplink (EU) transmission is disclosed. The WTRU receives information via radio resource control (RRC) signaling and receives downlink (DL) control information for at least EU transmission. The WTRU determines whether the DL control information is intended for the WTRU based at least upon a first forty bit specific code sequence and a second forty bit specific code sequence received in at least one time slot and determines whether the DL control information is the first type or the second type. The WTRU utilizes the DL control information of the first type or the second type for at least EU transmission on a condition that the DL control information is intended for the WTRU.

14 Claims, 2 Drawing Sheets

(51) Int. Cl.
*H04L 5/14* (2006.01)
*H04L 5/00* (2006.01)
*H04W 48/16* (2009.01)
*H04W 72/04* (2009.01)

(52) U.S. Cl.
CPC .............. *H04L 1/0072* (2013.01); *H04L 5/14* (2013.01); *H04L 5/0053* (2013.01); *H04L 5/0091* (2013.01); *H04W 48/16* (2013.01); *H04W 72/042* (2013.01)

(56) References Cited

U.S. PATENT DOCUMENTS

| | | |
|---|---|---|
| 5,237,610 A | 8/1993 | Gammie et al. |
| 5,301,247 A | 4/1994 | Rasmussen et al. |
| 5,313,467 A | 5/1994 | Varghese et al. |
| 5,355,412 A | 10/1994 | Kangas |
| 5,357,525 A | 10/1994 | Moriue et al. |
| 5,390,197 A | 2/1995 | MacDonald et al. |
| 5,404,355 A * | 4/1995 | Raith .......................... 370/311 |
| 5,659,569 A | 8/1997 | Padovani et al. |
| 5,673,259 A | 9/1997 | Quick, Jr. |
| 5,689,518 A | 11/1997 | Galand et al. |
| 5,689,563 A | 11/1997 | Brown et al. |
| 5,708,710 A | 1/1998 | Duda |
| 5,722,077 A * | 2/1998 | Kanai ......................... 455/452.1 |
| 5,729,541 A | 3/1998 | Hamalainen et al. |
| 5,845,212 A * | 12/1998 | Tanaka ......................... 455/437 |
| 5,862,160 A | 1/1999 | Irvin et al. |
| 5,917,810 A | 6/1999 | De Bot |
| 5,917,840 A | 6/1999 | Cheney et al. |
| 5,930,706 A | 7/1999 | Raith |
| 6,005,871 A | 12/1999 | Petersen et al. |
| 6,104,709 A | 8/2000 | Rinchiuso et al. |
| 6,108,550 A | 8/2000 | Wiorek et al. |
| 6,134,597 A | 10/2000 | Rieth et al. |
| 6,141,336 A | 10/2000 | Bauchot et al. |
| 6,172,971 B1 * | 1/2001 | Kim ......................... 370/348 |
| 6,201,811 B1 | 3/2001 | Larsson et al. |
| 6,236,646 B1 | 5/2001 | Beming et al. |
| 6,240,304 B1 | 5/2001 | Blankenstein et al. |
| 6,269,088 B1 | 7/2001 | Masui et al. |
| 6,366,779 B1 | 4/2002 | Bender et al. |
| 6,370,134 B1 | 4/2002 | Aramaki |
| 6,373,946 B1 | 4/2002 | Johnston |
| 6,377,809 B1 | 4/2002 | Rezaiifar et al. |
| 6,405,340 B1 | 6/2002 | Irvin et al. |
| 6,424,632 B1 | 7/2002 | Poret et al. |
| 6,430,163 B1 | 8/2002 | Mustajarvi |
| 6,438,113 B1 | 8/2002 | Yang et al. |
| 6,442,152 B1 | 8/2002 | Park et al. |
| 6,735,185 B1 | 5/2004 | Noneman |
| 6,850,509 B2 | 2/2005 | Lee et al. |
| 6,859,445 B1 | 2/2005 | Moon et al. |
| 6,871,313 B2 | 3/2005 | Gopalakrishnan |
| 6,882,727 B1 * | 4/2005 | Vialen et al. .................... 380/33 |
| 6,901,104 B1 * | 5/2005 | Du et al. ......................... 375/142 |
| 6,915,473 B2 | 7/2005 | Bolourchi et al. |
| 6,928,066 B1 | 8/2005 | Moon et al. |
| 6,963,540 B2 | 11/2005 | Choi et al. |
| 6,973,579 B2 | 12/2005 | Dick et al. |
| 7,054,633 B2 | 5/2006 | Seo et al. |
| 7,058,398 B2 | 6/2006 | Livet et al. |
| 7,076,005 B2 | 7/2006 | Willenegger |
| 7,079,848 B2 | 7/2006 | Das et al. |
| 7,107,014 B2 | 9/2006 | Kekki |
| 7,124,350 B2 | 10/2006 | Chao et al. |
| 7,158,495 B2 | 1/2007 | Jei |
| 7,162,675 B2 | 1/2007 | Das et al. |
| 7,177,658 B2 | 2/2007 | Willenegger et al. |
| 7,181,298 B1 | 2/2007 | Yoshio et al. |
| 7,184,447 B1 | 2/2007 | Koo et al. |
| 7,184,743 B2 | 2/2007 | Walton et al. |
| 7,197,022 B2 | 3/2007 | Stanwood et al. |
| 7,200,788 B2 | 4/2007 | Hiraki et al. |
| 7,283,502 B1 | 10/2007 | Abraham et al. |
| 7,330,482 B2 | 2/2008 | Boumendil et al. |
| 7,366,094 B2 | 4/2008 | Speight |
| 7,366,105 B2 | 4/2008 | Yi et al. |
| 7,394,799 B2 | 7/2008 | Li et al. |
| 7,426,201 B2 | 9/2008 | Kim et al. |
| 7,480,261 B2 | 1/2009 | Speight |
| 7,496,804 B2 | 2/2009 | Juncker |
| 7,508,804 B2 | 3/2009 | Das et al. |
| 7,539,165 B2 | 5/2009 | Toskala et al. |
| 7,558,228 B2 | 7/2009 | Lee et al. |
| 7,558,602 B2 | 7/2009 | Kogiantis et al. |
| 7,580,394 B2 | 8/2009 | Garcia-Luna-Aceves |
| 7,693,110 B2 | 4/2010 | Love et al. |
| 7,783,953 B2 | 8/2010 | Bolourchi et al. |
| 8,023,463 B2 | 9/2011 | Dick et al. |
| 8,051,360 B2 | 11/2011 | Bolourchi et al. |
| 8,332,719 B2 | 12/2012 | You et al. |
| 8,363,593 B2 | 1/2013 | Zhang et al. |
| 2002/0051431 A1 | 5/2002 | Choi et al. |
| 2002/0093918 A1 | 7/2002 | Kim et al. |
| 2002/0181422 A1 | 12/2002 | Parantainen et al. |
| 2002/0194571 A1 | 12/2002 | Parr et al. |
| 2003/0050074 A1 | 3/2003 | Kogiantis et al. |
| 2003/0142657 A1 | 7/2003 | Forssell |
| 2003/0219037 A1 * | 11/2003 | Toskala et al. ............... 370/496 |
| 2004/0043783 A1 * | 3/2004 | Anderson ..................... 455/522 |
| 2004/0085924 A1 | 5/2004 | Zhang et al. |
| 2004/0085939 A1 | 5/2004 | Wallace et al. |
| 2004/0085989 A1 * | 5/2004 | Boumendil et al. .......... 370/442 |
| 2005/0100038 A1 | 5/2005 | Pietraski et al. |
| 2007/0064666 A1 | 3/2007 | Kwun et al. |
| 2010/0318886 A1 | 12/2010 | Bolourchi et al. |
| 2012/0269177 A1 | 10/2012 | Alapuranen et al. |

FOREIGN PATENT DOCUMENTS

| | | |
|---|---|---|
| EP | 0532227 | 3/1993 |
| EP | 0993128 | 4/2000 |
| EP | 1277358 B1 | 4/2000 |
| EP | 1006670 | 6/2000 |
| EP | 1187500 | 3/2002 |
| EP | 1248476 | 10/2002 |
| EP | 1248476 B1 | 10/2002 |
| EP | 1324500 | 7/2003 |
| EP | 1339188 A1 | 8/2003 |
| EP | 1351411 A1 | 10/2003 |
| EP | 1351424 | 10/2003 |
| EP | 1355442 A1 | 10/2003 |
| EP | 1044514 B1 | 4/2007 |
| EP | 1933476 B1 | 10/2010 |
| EP | 1418786 B1 | 1/2012 |
| EP | 1620965 B1 | 7/2012 |
| GB | 2372409 | 8/2002 |
| GB | 2382956 | 6/2003 |
| JP | 01-196774 | 8/1989 |
| JP | 05-236073 | 9/1993 |
| JP | 08-316967 | 11/1996 |
| JP | 11-136138 | 5/1999 |
| JP | 11-196070 | 7/1999 |
| TW | 276382 | 5/1996 |
| WO | 99/38076 | 7/1999 |
| WO | 00/28763 | 3/2000 |
| WO | 00/21210 | 4/2000 |
| WO | 00/22865 A2 | 4/2000 |
| WO | 00/28763 | 5/2000 |
| WO | 00/30378 | 5/2000 |
| WO | 00/57660 | 9/2000 |
| WO | 01/01609 | 1/2001 |
| WO | 01/05050 | 1/2001 |
| WO | 02/51177 | 6/2002 |
| WO | 02/051177 | 6/2002 |
| WO | 02/096030 | 11/2002 |
| WO | 03/096694 | 11/2003 |

OTHER PUBLICATIONS

3rd Generation Partnership Project; Technical Specification Group Radio Access Network; Physical channels and mapping of transport (56) References Cited

OTHER PUBLICATIONS channels onto physical channels (FDD) (Release 4), 3GPP TS 25.211 V4.6.0 (Sep. 2002).
3rd Generation Partnership Project; Technical Specification Group Radio Access Network; Spreading and modulation (FDD) (Release 4), 3G TS 25.213 V4.3.0 (Jun. 2002).
Third Generation Partnership Project, "Technical Specification Group Radio Access Network; Physical Layer Procedures (FDD) (Release 4)." 3GPP TS 25.214 v4.2.0 (Sep. 2001).
Third Generation Partnership Project, "Technical Specification Group Radio Access Network; Physical Layer Procedures (FDD) (Release 4)." 3GPP TS 25.214 v4.6.0 (Mar. 2003).
Third Generation Partnership Project, "Technical Specification Group Radio Access Network; Physical Layer Procedures (FDD) (Release 5)." 3GPP TS 25.214 v5.6.0 (Sep. 2003).
Third Generation Partnership Project, "Technical Specification Group Radio Access Network; Physical Layer Procedures (FDD) (Release 5)." 3GPP TS 25.214 v5.9.0 (Jun. 2004).
Third Generation Partnership Project, "Technical Specification Group Radio Access Network; Physical channels and mapping of transport channels onto physical channels (TDD) (Release 1999)," 3GPP TS 25.221 V3.8.0 (Sep. 2001).
Third Generation Partnership Project, "Technical Specification Group Radio Access Network; Physical channels and mapping of transport channels onto physical channels (TDD) (Release 1999)," 3GPP TS 25.211 V3.11.0 (Sep. 2002).
Third Generation Partnership Project, "Technical Specification Group Radio Access Network; Physical channels and mapping of transport channels onto physical channels (TDD) (Release 4)," 3GPP TS 25.211 V4.0.0 (Mar. 2001).
Third Generation Partnership Project, "Technical Specification Group Radio Access Network; Physical channels and mapping of transport channels onto physical channels (TDD) (Release 4)," 3GPP TS 25.211 V4.2.0 (Sep. 2001).
Third Generation Partnership Project, "Technical Specification Group Radio Access Network; Physical channels and mapping of transport channels onto physical channels (TDD) (Reelase 5)," 3GPP TS 25.221 V5.5.0 (Jun. 2003).
3rd Generation Partnership Project; Technical Specification Group Radio Access Network; Radio Resource Control (RRC); Protocol Specification (Release 4), 3GPP TS 25.331 V4.14.0 (Jun. 2004).
Third Generation Partnership Project, "Technical Specification Group Radio Access Network; High Speed Downlink Packet Access; Overall UTRAN Description (Release 5)," 3GPP TR 25.855 V5.0.0 (Sep. 2001).
"DL Control Channel Structures for Parameters Sent Simultaneously With HS-DSCH TTI." TSG-RAN WG1/WG2 Adhoc on HSDPA, Sophia Antipolis, France, (Apr. 5-6, 2001).
3GPP TSG RAN WG 1 Tdoc R1-02-1277, Nokia, "Two Threshold Node B Packet Scheduling," Shanghai, China, Nov. 2002.
3GPP TSG RAN WG 1 Tdoc R1-02-1350, Motorola, "Design Considerations for Enhanced Uplink Dedicated Channel," Shanghai, China, Nov. 2002.
3GPP TSG RAN WG Tdoc R1-02-0018, Nokia, "Compact Signalling of Multi-code Allocation for HSDPA, version 2," Espoo, Finland, Jan. 2002.
3rd Generation Partnership Project; Technical Specification Group Radio Access Network; Physical channels and mapping of transport channels onto physical channels (FDD) (Release 1999) 3GPP TS 25.211 V3.12.0 (Sep. 2002).
3rd Generation Partnership Project; Technical Specification Group Radio Access Network; Physical channels and mapping of transport channels onto physical channels (FDD) (Release 4) 3GPP TS 25.211 V4.6.0 (Sep. 2002).
3rd Generation Partnership Project; Technical Specification Group Radio Access Network; Physical channels and mapping of transport channels onto physical channels (FDD) (Release 5) 3GPP TS 25.211 V5.5.0 (Sep. 2003).
3rd Generation Partnership Project; Technical Specification Group Radio Access Network; Physical channels and mapping of transport channels onto physical channels (FDD) (Release 6) 3GPP TS 25.211 V6.1.0 (Jun. 2004).
3rd Generation Partnership Project; Technical Specification Group Radio Access Network; Physical layer procedures (Release 8); 3GPP TS 36.213 V0.2.1 (Oct. 2006).
3rd Generation Partnership Project; Technical Specification Group Radio Access Network; Spreading and modulation (FDD) (Release 1999), 3GPP TS 25.213 V3.8.0 (Jun. 2002).
3rd Generation Partnership Project; Technical Specification Group Radio Access Network; Spreading and modulation (FDD) (Release 1999), 3GPP TS 25.213 V3.9.0 (Dec. 2003).
3rd Generation Partnership Project; Technical Specification Group Radio Access Network; Spreading and modulation (FDD) (Release 4), 3GPP TS 25.213 V4.3.0 (Jun. 2002).
3rd Generation Partnership Project; Technical Specification Group Radio Access Network; Spreading and modulation (FDD) (Release 4), 3G TS 25.213 V4.4.0 (Dec. 2003).
3rd Generation Partnership Project; Technical Specification Group Radio Access Network; Spreading and modulation (FDD) (Release 5), 3GPP TS 25.213 V5.5.0 (Dec. 2002).
3rd Generation Partnership Project; Technical Specification Group Radio Access Network; Spreading and modulation (FDD) (Release 6), 3GPP TS 25.213 V6.0.0 (Dec. 2003).
3rd Generation Partnership Project; Technical Specification Group Radio Access Network; FDD Enhanced Uplink; Overall description; Stage 2 (Release 6), 3GPP TS 25.309 V0.2.0 (Jun. 2004).
3rd Generation Partnership Project; Technical Specification Group Radio Access Network; Medium Access Control (MAC) protocol specification (Release 1999), 3GPP TS 25.321 V3.16.0 (Sep. 2003).
3rd Generation Partnership Project; Technical Specification Group Radio Access Network; Medium Access Control (MAC) protocol specification (Release 1999), 3GPP TS 25.321 V3.17.0 (Jun. 2004).
3rd Generation Partnership Project; Technical Specification Group Radio Access Network; Medium Access Control (MAC) protocol specification (Release 4), 3GPP TS 25.321 V4.9.0 (Sep. 2003).
3rd Generation Partnership Project; Technical Specification Group Radio Access Network; Medium Access Control (MAC) protocol specification (Release 4), 3GPP TS 25.321 V4.10.0 (Jun. 2004).
3rd Generation Partnership Project; Technical Specification Group Radio Access Network; Medium Access Control (MAC) protocol specification (Release 5), 3GPP TS 25.321 V5.6.0 (Sep. 2003).
3rd Generation Partnership Project; Technical Specification Group Radio Access Network; Medium Access Control (MAC) protocol specification (Release 5), 3GPP TS 25.321 V5.9.0 (Jun. 2004).
3rd Generation Partnership Project; Technical Specification Group Radio Access Network; Medium Access Control (MAC) protocol specification (Release 6), 3GPP TS 25.321 V6.2.0 (Jun. 2004).
3rd Generation Partnership Project; Technical Specification Group Radio Access Network; Radio Resource Control (RRC) Protocol specification (Release 1999), 3GPP TS 25.331 V3.16.0 (Sep. 2003).
3rd Generation Partnership Project; Technical Specification Group Radio Access Network; Radio Resource Control (RRC) Protocol specification (Release 1999), 3GPP TS 25.331 V3.19.0 (Jun. 2004).
3rd Generation Partnership Project; Technical Specification Group Radio Access Network; Radio Resource Control (RRC); Protocol Specification (Release 4), 3GPP TS 25.331 V4.11.0 (Sep. 2003).
3rd Generation Partnership Project; Technical Specification Group Radio Access Network; Radio Resource Control (RRC); Protocol Specification (Release 4), 3GPP TS 25.331 V4.14.0 (Jun. 2003).
3rd Generation Partnership Project; Technical Specification Group Radio Access Network; Radio Resource Control (RRC); Protocol Specification (Release 5), 3GPP TS 25.331 V5.6.0 (Sep. 2003).
3rd Generation Partnership Project; Technical Specification Group Radio Access Network; Radio Resource Control (RRC); Protocol Specification (Release 5), 3GPP TS 25.331 V5.9.0 (Jun. 2004).
3rd Generation Partnership Project; Technical Specification Group Radio Access Network; Radio Resource Control (RRC); Protocol Specification (Release 6), 3GPP TS 25.331 V6.2.0 (Jun. 2004).

(56) References Cited

OTHER PUBLICATIONS

Balachandran et al., "Design of a Medium Access Control Feedback Mechanism for Cellular TDMA Packet Data Systems", IEEE Journal on Selected Areas in Communications, vol. 18, No. 9, pp. 1719-1730, (Sep. 2000).
Gourgue, "Air Interface of the Future European Fully Digital Trunk Radio System", Proceedings of the Vehicular Technology Conference, vol. CONF. 43, pp. 714-717 (May 1993).
Interdigital Communication Corporation, "Implicit UE Identification for HSDPA Downlink Signaling", TDOC R1-01-0810, 3GPP RAN WG1 Meeting 22, (Aug. 2001), available at: http://www.3gpp.org/ftp.tsg_ran/WG1_RL1.
Interdigital, "Updated Recommendation for UE-specific CRC", TDOC R1-01-1066, 3GPP TSG RAN WG 1 AD HOC Meeting On HSDPA, (Nov. 2001), avaliable at: http://www.3gpp.org/ftp/tsg_ran/WG1_RL1.
Interdigital, "TDD HSDPA Downlink Signaling," TSG-RAN Working Group 2 Meeting #xx, TSGR2#21(01)1056 (May 21-25, 2001).
Motorola, "Control Channel Structure for High Speed DSCH (HS-DSCH)," TSGR1#16(00) 1242, R2-12A010021, pp. 1-5 (Apr. 5-6, 2001).
Mouly et al. "Chapter 4, The Radio Interface," The GSM System for Mobile Communications; 1992, pp. 186-259.
Siemens et al., "Downlink Signalling Requirements for TDD HSDPA: Text Proposal for TR 25.855," 3GPP TSG RAN WG2 #21, R2-011274 (May 21-25, 2001).
3rd Generation Partnership Project; Technical Specification Group Radio Access Network; Multiplexing and channel coding (Release 8); 3GPP TS 36.212 V0.2.1 (Nov. 2006).
Third Generation Partnership Project, "Technical Specification Group Radio Access Network; Multiplexing and channel coding (FDD) (Release 1999)," 3GPP TS 25.212 V3.5.0 (Dec. 2000).
Third Generation Partnership Project, "Technical Specification Group Radio Access Network; Multiplexing and channel coding (FDD) (Release 1999)," 3GPP TS 25.212 V3.7.0 (Sep. 2001).
Third Generation Partnership Project, "Technical Specification Group Radio Access Network; Multiplexing and channel coding (FDD) (Release 1999)," 3GPP TS 25.212 V3.11.0 (Sep. 2002).
Third Generation Partnershp Project, "Technical Specification Group Radio Access Network; Multiplexing and channel coding (FDD) (Release 4)," 3GPP TS 25.212 V4.0.0 (Dec. 2000).
Third Generation Partnership Project, "Technical Specification Group Radio Access Network; Multiplexing and channel coding (FDD) (Release 4)," 3GPP TS 25.212 V4.2.0 (Sep. 2001).
Third Generation Partnership Project, "Technical Specification Group Radio Access Network; Multiplexing and channel coding (FDD) (Release 4)," 3GPP TS 25.212 V4.6.0 (Sep. 2002).
Third Generation Partnership Project, "Technical Specification Group Radio Access Network; Multiplexing and channel coding (FDD) (Release 5)," 3GPP TS 25.212 V5.6.0 (Sep. 2003).
Third Generation Partnership Project, "Technical Specification Group Radio Access Network; Multiplexing and channel coding (FDD) (Release 5)," 3GPP TS 25.212 V5.9.0 (Jun. 2004).
Third Generation Partnership Project, "Technical Specification Group Radio Access Network; Multiplexing and channel coding (FDD) (Release 6)," 3GPP TS 25.212 V6.2.0 (Jun. 2004).
Third Generation Partnership Project, "Technical Specification Group Radio Access Network; Physical Layer Procedures (FDD) (Release 1999)," 3GPP TS 25.214 v3.6.0 (Mar. 2001).
Third Generation Partnership Project, "Technical Specification Group Radio Access Network; Physical Layer Procedures (FDD) (Release 1999)," 3GPP TS 25.214 v3.8.0 (Sep. 2001).
Third Generation Partnership Project, "Technical Specification Group Radio Access Network; Physical Layer Procedures (FDD) (Release 1999)," 3GPP TS 25.214 v3.12.0 (Mar. 2003).
Third Generation Partnership Project, "Technical Specification Group Radio Access Network; Physical Layer Procedures (FDD) (Release 4)," 3GPP TS 25.214 v4.0.0 (Mar. 2001).
Third Generation Partnership Project, "Technical Specification Group Radio Access Network; Physical Layer Procedures (FDD) (Release 4)," 3GPP TS 25.214 v4.2.0 (Sep. 2001).
Third Generation Partnership Project, "Technical Specification Group Radio Access Network; Physical Layer Procedures (FDD) (Release 4)," 3GPP TS 25.214 v4.6.0 (Mar. 2003).
Third Generation Partnership Project, "Technical Specification Group Radio Access Network; Physical Layer Procedures (FDD) (Release 5)," 3GPP TS 25.214 v5.6.0 (Sep. 2003).
Third Generation Partnership Project, "Technical Specification Group Radio Access Network; Physical Layer Procedures (FDD) (Release 5)," 3GPP TS 25.214 v5.9.0 (Jun. 2004).
Third Generation Partnership Project, "Technical Specification Group Radio Access Network; Physical Layer Procedures (FDD) (Release 6)," 3GPP TS 25.214 v6.2.0 (Jun. 2004).
Third Generation Partnership Project, "Technical Specification Group Radio Access Network; Physical channels and mapping of transport channels onto physical channels (TDD) (Release 1999)," 3GPP TS 25.221 V3.6.0 (Mar. 2001).
Third Generation Partnership Project, "Technical Specification Group Radio Access Network; Physical channels and mapping of transport channels onto physical channels (TDD) (Release 1999)," 3GPP TS 25.221 V3.11.0 (Sep. 2002).
Third Generation Partnership Project, "Technical Specification Group Radio Access Network; Physical channels and mapping of transport channels onto physical channels (TDD) (Release 4)," 3GPP TS 25.221 V4.0.0 (Mar. 2001).
Third Generation Partnership Project, "Technical Specification Group Radio Access Network; Physical channels and mapping of transport channels onto physical channels (TDD) (Release 4)," 3GPP TS 25.221 V4.2.0 (Sep. 2001).
Third Generation Partnership Project, "Technical Specification Group Radio Access Network; Physical channels and mapping of transport channels onto physical channels (TDD) (Release 4)," 3GPP TS 25.221 V4.7.0 (Dec. 2002).
Third Generation Partnership Project, "Technical Specification Group Radio Access Network; Physical channels and mapping of transport channels onto physical channels (TDD) (Release 5)," 3GPP TS 25.221 V5.5.0 (Jun. 2003).
Third Generation Partnership Project, "Technical Specification Group Radio Access Network; Physical channels and mapping of transport channels onto physical channels (TDD) (Release 6)," 3GPP TS 25.221 V6.1.0 (Jun. 2004).
Third Generation Partnership Project, "Technical Specification Group Radio Access Network; Multiplexing and channel coding (TDD) (Release 1999)," 3GPP TS 25.222 V3.6.0 (Mar. 2001).
Third Generation Partnership Project, "Technical Specification Group Radio Access Network; Multiplexing and channel coding (TDD) (Release 1999)," 3GPP TS 25.222 V3.7.0 (Sep. 2001).
Third Generation Partnership Project, "Technical Specification Group Radio Access Network; Multiplexing and channel coding (TDD) (Release 1999)," 3GPP TS 25.222 V3.10.0 (Sep. 2002).
Third Generation Partnership Project, "Technical Specification Group Radio Access Network; Multiplexing and channel coding (TDD) (Release 4)," 3GPP TS 25.222 V4.0.0 (Mar. 2001).
Third Generation Partnership Project, "Technical Specification Group Radio Access Network; Multiplexing and channel coding (TDD) (Release 4)," 3GPP TS 25.222 V4.1.0 (Sep. 2001).
Third Generation Partnership Project, "Technical Specification Group Radio Access Network; Multiplexing and channel coding (TDD) (Release 4)," 3GPP TS 25.222 V4.6.0 (Dec. 2002).
Third Generation Partnership Project, "Technical Specification Group Radio Access Network; Multiplexing and channel coding (TDD) (Release 4)," 3GPP TS 25.222 V4.7.0 (Dec. 2003).
Third Generation Partnership Project, "Technical Specification Group Radio Access Network; Multiplexing and channel coding (TDD) (Release 5)," 3GPP TS 25.222 V5.5.0 (Jun. 2003).
Third Generation Partnership Project, "Technical Specification Group Radio Access Network; Multiplexing and channel coding (TDD) (Release 5)," 3GPP TS 25.222 V5.6.0 (Dec. 2003).
Third Generation Partnership Project, "Technical Specification Group Radio Access Network; Multiplexing and channel coding (TDD) (Release 6)," 3GPP TS 25.222 V6.0.0 (Dec. 2003).

(56) References Cited

OTHER PUBLICATIONS

Third Generation Partnership Project, "Technical Specification Group Radio Access Network; UTRA High Speed Downlink Packet Access (HSDPA); Overall Description; Stage 2 (Release 5)," 3GPP TS 25.308 V5.0.0 (Sep. 2001).
Third Generation Partnership Project, "Technical Specification Group Radio Access Network; UTRA High Speed Downlink Packet Access (HSDPA); Overall Description; Stage 2 (Release 5)," 3GPP TS 25.308 V5.4.0 (Mar. 2003).
Third Generation Partnership Project, "Technical Specification Group Radio Access Network; UTRA High Speed Downlink Packet Access (HSDPA); Overall Description; Stage 2 (Release 5)," 3GPP TS 25.308 V5.5.0 (Mar. 2004).
Third Generation Partnership Project, "Technical Specification Group Radio Access Network; UTRA High Speed Downlink Packet Access (HSDPA); Overall Description; Stage 2 (Release 6)," 3GPP TS 25.308 V6.1.0 (Mar. 2004).
Third Generation Partnership Project, "Technical Specification Group Radio Access Network; UTRAN Overall Description (Release 1999)," 3GPP TS 25.401 V3.6.0 (Mar. 2001).
Third Generation Partnership Project, "Technical Specification Group Radio Access Network; UTRAN Overall Description (Release 1999)," 3GPP TS 25.401 V3.8.0 (Sep. 2001).
Third Generation Partnership Project, "Technical Specification Group Radio Access Network; UTRAN Overall Description (Release 1999)," 3GPP TS 25.401 V3.10.0 (Jun. 2002).
Third Generation Partnership Project, "Technical Specification Group Radio Access Network; UTRAN Overall Description (Release 4)," 3GPP TS 25.401 V4.0.0 (Mar. 2001).
Third Generation Partnership Project, "Technical Specification Group Radio Access Network; UTRAN Overall Description (Release 4)," 3GPP TS 25.401 V4.2.0 (Sep. 2001).
Third Generation Partnership Project, "Technical Specification Group Radio Access Network; UTRAN Overall Description (Release 4)," 3GPP TS 25.401 V4.6.0 (Dec. 2002).
Third Generation Partnership Project, "Technical Specification Group Radio Access Network; UTRAN Overall Description (Release 5)," 3GPP TS 25.401 V5.1.0 (Sep. 2001).
Third Generation Partnership Project, "Technical Specification Group Radio Access Network; UTRAN Overall Description (Release 5)," 3GPP TS 25.401 V5.6.0 (Jun. 2003).
Third Generation Partnership Project, "Technical Specification Group Radio Access Network; UTRAN Overall Description (Release 5)," 3GPP TS 25.401 V5.8.0 (Jun. 2004).
Third Generation Partnership Project, "Technical Specification Group Radio Access Network; UTRAN Overall Description (Release 6)," 3GPP TS 25.401 V6.1.0 (Jun. 2003).
Third Generation Partnership Project, "Technical Specification Group Radio Access Network; UTRAN Overall Description (Release 6)," 3GPP TS 25.401 V6.3.0 (Jun. 2004).
Third Generation Partnership Project, "Technical Specification Group Radio Access Network; High Speed Downlink Packet Access; Overall UTRAN Description (Release 5)," 3GPP TR 25.855 v0.0.3; (May 2001).
Third Generation Partnership Project, "Technical Specification Group Radio Access Network; High Speed Downlink Packet Access; Overall UTRAN Description (Release 5)," 3GPP TR 25.855 V5.0.0; (Sep. 2001).
Third Generation Partnership Project, "Technical Specification Group Radio Access Network; Feasibility Study for Enhanced Uplink for UTRA FDD (Release 6)," 3GPP TR 25.896 V1.0.1, pp. 16-21 (Oct. 2003).
Third Generation Partnership Project, "Technical Specification Group Radio Access Network; Feasibility Study for Enhanced Uplink for UTRA FDD (Release 6)," 3GPP TR 25.896 V1.0.2 (Oct. 2003).
Third Generation Partnership Project, "Technical Specification Group Radio Access Network; Feasibility Study for Enhanced Uplink for UTRA FDD (Release 6)," 3GPP TR 25.896 V6.0.0 (Mar. 2004).

Third Generation Partnership Project, "Technical Specification Group Radio Access Networks; User Equipment (UE) radio transmission and reception (FDD) (Release 1999)," 3GPP TS 25.101 V3.15.0 (Sep. 2003).
Third Generation Partnership Project, "Technical Specification Group Radio Access Networks; User Equipment (UE) radio transmission and reception (FDD) (Release 1999)," 3GPP TS 25.101 V3.17.0 (Mar. 2004).
Third Generation Partnership Project, "Technical Specification Group Radio Access Networks; User Equipment (UE) radio transmission and reception (FDD) (Release 4)," 3GPP TS 25.101 V4.9.0 (Sep. 2003).
Third Generation Partnership Project, "Technical Specification Group Radio Access Networks; User Equipment (UE) radio transmission and reception (FDD) (Release 4)," 3GPP TS 25.101 V4.11.0 (Mar. 2004).
Third Generation Partnership Project, "Technical Specification Group Radio Access Network; User Equipment (UE) radio transmission and reception (FDD) (Release 5)," 3GPP TS 25.101 V5.8.0 (Sep. 2003).
Third Generation Partnership Project, "Technical Specification Group Radio Access Network; User Equipment (UE) radio transmission and reception (FDD) (Release 5)," 3GPP TS 25.101 V5.11.0 (Jun. 2004).
Third Generation Partnership Project, "Technical Specification Group Radio Access Network; User Equipment (UE) radio transmission and reception (FDD) (Release 6)," 3GPP TS 25.101 V6.2.0 (Sep. 2003).
Third Generation Partnership Project, "Technical Specification Group Radio Access Network; User Equipment (UE) radio transmission and reception (FDD) (Release 6)," 3GPP TS 25.101 V6.4.0 (Mar. 2004).
Third Generation Partnership Project, "Technical Specification Group Radio Access Network; User Equipment (UE) radio transmission and reception (FDD) (Release 6)," 3GPP TS 25.101 V6.5.0 (Sep. 2004).
Third Generation Partnership Project, "Technical Specification Group Radio Access Network; Physical Layer Procedures (TDD) (Release 1999)," 3GPP TS 25.224 V3.13.0 (Sep. 2003).
Third Generation Partnership Project, "Technical Specification Group Radio Access Network; Physical Layer Procedures (TDD) (Release 4)," 3GPP TS 25.224 V4.9.0 (Sep. 2003).
Third Generation Partnership Project, "Technical Specification Group Radio Access Network; Physical layer procedures (TDD) (Release 5)," 3GPP TS 25.224 V5.6.0 (Sep. 2003).
Third Generation Partnershp Project, "Technical Specification Technical Specification Group GSM EDGE Radio Access Network; General Packet Radio Service (GPRS); Mobile Station (MS)—Base Station System (BSS) interface; Radio Link Control/ Medium Access Control (RLC/MAC) protocol (Release 1997)," 3GPP TS 04.60 V6.14.0 (Jul. 2002).
Third Generation Partnershp Project, "Technical Specification Group GSM EDGE Radio Access Network; General Packet Radio Service (GPRS); Mobile Station (MS)—Base Station System (BSS) interface; Radio Link Control/ Medium Access Control (RLC/MAC) protocol (Release 1998)," 3GPP TS 04.60 V7.10.0 (Jul. 2002).
Third Generation Partnershp Project, "Technical Specification Group GSM/EDGE Radio Access Network; General Packet Radio Service (GPRS); Mobile Station (MS)—Base Station System (BSS) interface; Radio Link Control/ Medium Access Control (RLC/MAC) protocol (Release 1999)," 3GPP TS 04.60 V8.16.0 (Sep. 2002).
Third Generation Partnershp Project, "Technical Specification Group GSM/EDGE Radio Access Network; General Packet Radio Service (GPRS); Mobile Station (MS)—Base Station System (BSS) interface; Radio Link Control/ Medium Access Control (RLC/MAC) protocol (Release 1999)," 3GPP TS 04.60 V8.20.0 (Sep. 2003).
Third Generation Partnershp Project, "Technical Specification Group GSM/EDGE Radio Access Network; General Packet Radio Service (GPRS); Mobile Station (MS)—Base Station System (BSS) interface; Radio Link Control/ Medium Access Control (RLC/MAC) protocol (Release 1999)," 3GPP TS 04.60 V8.24.0 (Jul. 2004).
Third Generation Partnershp Project, "Technical Specification Group GSM EDGE Radio Access Network; General Packet Radio Service (56) References Cited

OTHER PUBLICATIONS (GPRS); Mobile radio interface layer 3 specification, Radio Resource Control Protocol (Release 4)," 3GPP TS 44.018 V4.3.0 (Jan. 2001).
Third Generation Partnershp Project, "Technical Specification Group GSM/EDGE Radio Access Network; Mobile radio interface layer 3 specification, Radio Resource Control (RRC) protocol (Release 4)," 3GPP TS 44.018 V4.15.0 (Jul. 2003).
Third Generation Partnershp Project, "Technical Specification Group GSM/EDGE Radio Access Network; Mobile radio interface layer 3 specification, Radio Resource Control (RRC) protocol (Release 4)," 3GPP TS 44.018 V4.18.0 (Jul. 2004).
Third Generation Partnershp Project, "Technical Specification Group GSM/EDGE Radio Access Network; Mobile radio interface layer 3 specification; Radio Resource Control (RRC) protocol (Release 5)," 3GPP TS 44.018 V5.12.0 (Sep. 2003).
Third Generation Partnershp Project, "3rd Generation Partnership Project; Technical Specification Group GSM/EDGE Radio Access Network; Mobile radio interface layer 3 specification; Radio Resource Control (RRC) protocol (Release 6)," 3GPP TS 44.018 V6.4.1 (Sep. 2003).
Third Generation Partnershp Project, "Technical Specification Group GSM/EDGE Radio Access Network; Mobile radio interface layer 3 specification; Radio Resource Control (RRC) protocol (Release 6)," 3GPP TS 44.018 V6.8.0 (Jul. 2004).
Errata to Response of Respondents Samsung Electronics Co., Ltd., Samsung Electronics America, Inc., and Samsung Telecommunications America, LLC to the Complaint and Notice of Investigation, In the Matter of Certain Wireless Devices with 3G and/or 4G Capabilities and Components Thereof, Investigation No. 337-TA-868, Feb. 28, 2013.
Errata to Response of Huawei Respondents to Complaint Under Section 337 of the Tariff Act of 1930, As Amended, and Notice of Investigation, In the Matter of Certain Wireless Devices with 3G and/or 4G Capabilities and Components Thereof, Investigation No. 337-TA-868, Mar. 1, 2013.
Huawei Respondents Response to Complaint Under Section 337 of the Tariff Act of 1930, As Amended, and Notice of Investigation, In the Matter of Certain Wireless Devices with 3G and/or 4G Capabilities and Components Thereof, Investigation No. 337-TA-868, Feb. 21, 2013.
Nokia Corporation and Nokia Inc.'s Response to the Complaint of InterDigital Communications, Inc., InterDigital Technology Corporation, IPR Licensing, Inc., and InterDigital Holdings, Inc. Under Section 337 of the Tariff Act of 1930, As Amended, and Notice of Investigation, In the Matter of Certain Wireless Devices with 3G and/or 4G Capabilities and Components Thereof, Investigation No. 337-TA-868, Mar. 1, 2013.
Response of Respondents Samsung Electronics Co., Ltd., Samsung Electronics America, Inc., and Samsung Telecommunications America, LLC to the Complaint and Notice of Investigation, In the Matter of Certain Wireless Devices with 3G and/or 4G Capabilities and Components Thereof, Investigation No. 337-TA-868, Feb. 21, 2013.
Response of ZTE Corporation and ZTE (USA) to the Complaint of InterDigital Communications, LLC Under Section 337 of the Tariff Act of 1930, As Amended, and Notice of Investigation, In the Matter of Certain Wireless Devices with 3G and/or 4G Capabilities and Components Thereof, Investigation No. 337-TA-868, Feb. 22, 2013.
Das et al, "Evolution of UMTS Toward High-Speed Downlink Packet Access," Bell Labs Technical Journal, vol. 7, Issue 3, pp. 47-68 (2002).
Das et al, "Evolution of UMTS Toward High-Speed Downlink Packet Access," Bell Labs Technical Journal, vol. 7, Issue 3, pp. 47-68 (2002).
Dunlop et al., "Digital Mobile Communications and the TETRA System," John Willey & Sons, Ltd. (1999).
Ghosh et al., "Air-Interface for IXTREME/IxEV-DV," Proceedings of the IEEE Vehicular Technology Conference, pp. 2474-2478 (May 2001).
Ghosh et al., Amitava Ghosh, et al, "Shared Channels for Packet Data Transmission in W-CDMA," IEEE Vehicular Technology Conference, pp. 943-947 (Sep. 1999).
Kolding et al., "High Speed Downlink Packet Access: WCDMA Evolution," IEEE Vehicular Technology Society News (Feb. 2003).
Motorola, "Control Channel Structure for High Speed DSCH (HS-DSCH)," TSG-RAN Working Group 1 meeting #16, TSGR1#16(00) 1242 (Oct. 10-13, 2000).
Motorola, "Uplink enhancements for dedicated transport channels", 3GPP RAN1 #28bis, R1-02-1250, Espoo, Finland, (Oct. 8-9, 2002).
Nokia, "Issues to be studied for Enhanced Uplink DCH", TSG-RAN WG1 #28bis meeting, R1-02-1219, Espoo, Finland, (Oct. 8-9, 2002).
Ojanpera et al., "An Overview of Air Interface Multiple Access for IMT-2000/UMTS," IEEE Communications Magazine, 36(9): 82-86, 91-5 (Sep. 1998).
Siemens, "Downlink Control Channel Configuration for Enhanced Uplink Dedicated Transport Channel", TSG-RAN Working Group 1 #30, R1-030004 San Diego, CA, USA, (Jan. 7-10, 2003).
Zeng et al., "Harmonization of Global Third-Generation Mobile Systems," IEEE Communications Magazine, 38(12): 94-104 (Dec. 2000).
Third Generation Partnership Project, Technical Specification Group Radio Access Network; Feasibility Study for Enhanced Uplink for UTRA FDD (Release 6), pp. 1-70, 3GPP TR 25.896 V1.0.1, (Oct. 2003).
Third Generation Partnership Project; Technical Specification Group Radio Access Network; Physical layer—General description (Release 5), pp. 1-15, 3GPP TS 25.201 V5.2.0 (Sep. 2002).
Third Generation Partnership Project; Technical Specification Group Radio Access Network; Physical channels and mapping of transport channels onto physical channels (FDD) (Release 5), pp. 1-51, 3GPP TS 25.211 V5.2.0 (Sep. 2002).
Third Generation Partnership Project; Technical Specification Group Radio Access Network; PMultiplexing and channel coding (FDD) (Release 5), pp. 1-74, 3GPP TS 25.212 V5.0.0 (Mar. 2002).
Third Generation Partnership Project; Technical Specification Group Radio Access Network; PMultiplexing and channel coding (FDD) (Release 5), pp. 1-74, 3GPP TS 25.212 V5.1.0 (Jun. 2002).
Third Generation Partnership Project; Technical Specification Group Radio Access Network; PMultiplexing and channel coding (FDD) (Release 5), pp. 1-51, 3GPP TS 25.212 V5.2.0 (Sep. 2002).
Third Generation Partnership Project; Technical Specification Group Radio Access Network; PMultiplexing and channel coding (FDD) (Release 5), pp. 1-74, 3GPP TS 25.213 V5.2.0 (Sep. 2002).
Third Generation Partnership Project; Technical Specification Group Radio Access Network; Physical layer procedures (FDD) (Release 5), pp. 1-62, 3GPP TS 25.214 V5.2.0 (Sep. 2002).
ITU-R Ad Hoc, "Proposed Update of Section 5.1.1 of Rec. ITU-R M. 1457," TSG-RAN Meeting #21, RP-030429 (Sep. 16-19, 2003).
Answer, Affirmative Defenses, and Counterclaims to Amended Complaint, In the United States District Court for the District of Delaware, C.A. No. 13-011-RGA, Apr. 24, 2013.
Answer and Affirmative Defenses and Counterclaims of ZTE (USA) Inc., In the United States District Court for the District of Delaware, C.A. No. 13-0009-RGA, Jan. 31, 2013.
Answer and Counterclaims, In the United States District Court for the District of Delaware, C.A. No. 13-010 (RGA), Redacted Public Version, Mar. 7, 2013.
Answer and Counterclaims to Amended Complaint, In the United States District Court for the District of Delaware, C.A. No. 13-010 (RGA), Redacted Public Version, Apr. 1, 2013.
First Amended Answer and Counterclaims to Amended Complaint, In the United States District Court for the District of Delaware, C.A. No. 13-010 (RGA), Redacted Public Version, Aug. 6, 2013.
Public Version of Initial Determination On Violation of Section 337 and Recommended Determination on Remedy and Bond, In the Matter of Certain Wireless Devices with 3G and/or 4G Capabilities and Components Thereof, Investigation No. 337-TA-868, Jun. 13, 2014.
ZTE (USA) Inc.'S Amended Answer, Affirmative Defenses, and Counterclaims to Plaintiffs' Amended Complaint, In the United States District Court for the District of Delaware, C.A. No. 13-009-RGA, Redacted Public Version, Aug. 7, 2013.

(56) References Cited

OTHER PUBLICATIONS

ZTE Corp.'S Amended Answer, Affirmative Defenses, and Counterclaims to Plaintiffs' Amended Complaint, C.A. No. 13-009-RGA, Redacted Public Version, Sep. 3, 2013.

ZTE (USA) Inc.'S Answer, Affirmative Defenses, and Counterclaims to Plaintiffs' Amended Complaint, C.A. No. 13-009-RGA, Mar. 22, 2013.

3rd Generation Partnership Project, "Approved Report of the 19th TSG-RAN WG2 meeting (Sophia Antipolis, France, Feb. 19-23, 2001)," R2-010777, TSG-RAN WG2 meeting #20, Hayama, Japan, Apr. 9-13, 2001, pp. 1-102.

3rd Generation Partnership Project, "Approved Report of the 20th TSG-RAN WG2 meeting (Hayama, Japan, Apr. 9-13, 2001)," TSG-RAN WG2 meeting #21, Busan, Korea, May 21-25, 2001, p. 1-61.

3RD Generation Partnership Project, "Approved Report of the 21st TSG-RAN WG2 meeting (Busan, Korea, May 21-25, 2001)," R2-011511, TSG-RAN WG2 meeting #22, Berlin, German, Jul. 9-13, 2001, pp. 1-101.

3rd Generation Partnership Project, "Approved Report of the 22nd TSG-RAN WG2 meeting (Berlin, Germany, Jul. 9-13, 2001)," R2-011769, TSG-RAN WG2 meeting #23, Helsinki, Finland, Aug. 27-31, 2001, pp. 1-55.

3rd Generation Partnership Project, "Approved Report of the 23rd TSG-RAN WG2 meeting (Helsinki, Finland, Aug. 27-31, 2001)," R2-012211, TSG-RAN WG2 meeting #24, New York, NY, USA, Oct. 22-26, 2001, pp. 1-83.

3rd Generation Partnership Project, "Approved Report of the TSG-RAN WG1/WG2 joint meeting on HSDPA (Busan, Korea, May 24, 2001)," R2-011478, TSG-RAN WG1/WG2 joint meeting on HSDPA, Busan, Korea, May 24, 2001, pp. 1-7.

3rd Generation Partnership Project, "CR 25.212-138 (Rel-5): User-specific masking codes for HS-SCCH," R1-02-0543, 3GPP TSG-RAN WG1 Meeting #25, LGE, Paris, France, Apr. 2002, pp. 1-5.

3rd Generation Partnership Project, "CR 25.212-150 (Rel-5): Coding for HS-SCCH," R1-02-0964, 3GPP TSG-RAN WG1 Meeting #27, Oulu, Finland, Jul. 2002, pp. 1-6.

3rd Generation Partnership Project, "Draft agenda for the TSG RAN WG1#28bis," R1-02-1196, 3GPP TSG-RAN WG1 #28, Espoo, Finland, Oct. 2002, pp. 1-2.

3rd Generation Partnership Project, "Draft Agenda for TSG RAN WG1 meeting No. 28," R1-02-1021, 3GPP TSG RAN WG1#28, Seattle, USA, Aug. 2002, pp. 1-3.

3rd Generation Partnership Project, "Draft Agenda for TSG RAN WG1 meeting No. 29," R1-02-1262, 3GPP TSG RAN WG1#29, Shanghai, China, Nov. 2002, p. 1-2.

3rd Generation Partnership Project, "Draft Agenda for TSG RAN WG1 meeting No. 30," R1-030001, 3GPP TSG RAN WG1#30, San Diego, USA, Jan. 2003, pp. 1-2.

3rd Generation Partnership Project, "Draft minutes of RAN WG1 #18 meeting," R1-01-0188, 3GPP TSG RAN WG 1, Las Vegas, USA, Feb. 27-Mar. 2, 2001, pp. 1-36.

3rd Generation Partnership Project, "Draft minutes of RAN WG1 #19 meeting," R1-01-0432, 3GPP TSG RAN WG 1, Pusan, Korea, May 21-25, 2001, p. 1-41.

3rd Generation Partnership Project, "Draft minutes of RAN WG1 #21 meeting," R1-01-0990, 3GPP TSG RAN WG 1, Oct. 23-26, New York, NY, USA, pp. 1-44.

3rd Generation Partnership Project, "Draft minutes of RAN WG1 HSDPA Ad Hoc, including joint sessions with TSG RAN WG2," TSGR1-01-1105, TSG-RAN Working Group 1 meeting No. 22, Jeju, Korea, Nov. 19-23, 2001, pp. 1-17.

3rd Generation Partnership Project, "Draft minutes of RAN WG1 Rel-5 Ad Hoc meeting," R1-01-0768, 3GPP TSG RAN WG 1, Turin, Italy, Aug. 27-31, 2001, pp. 1-24.

3rd Generation Partnership Project, "Draft minutes of RAN WG1 Rel-5 Ad Hoc meeting," TSGR1-01-0***, 3GPP TSG RAN WG 1, Turin, Italy, Aug. 27-31, 2001, pp. 1-22.

3rd Generation Partnership Project, "Draft minutes of TSG RAN WG1 #28 meeting," R1-02-1197, 3GPP TSG-RAN WG1 #28bis, Espoo, Finland, Oct. 2002, pp. 1-50.

3rd Generation Partnership Project, "Draft minutes of RAN WG1#28bis meeting," R1-02-1263, TSG-RAN WG1 meeting #29, Shanghai, China, Nov. 2002, pp. 1-10.

3rd Generation Partnership Project, "Draft minutes of RAN WG1 #22 meeting," R1-01-1354, 3GPP TSG RAN WG 1, Jan. 8-11, Espoo, Finland, pp. 1-47.

3rd Generation Partnership Project, "Draft minutes of TSG RAN WG1 #23 meeting," R1-02-0198, TSG-RAN Working Group 1 meeting No. 24, Orlando, USA, Feb. 2002, pp. 1-30.

3rd Generation Partnership Project, "Draft minutes of TSG RAN WG1 #24 meeting," R1-02-0520, TSG-RAN Working Group 1 meeting No. 25, Paris, France, Apr. 2002, pp. 1-45.

3rd Generation Partnership Project, "Draft minutes of TSG RAN WG1 #25 meeting," R1-02-0688, TSG-RAN Working Group 1 meeting No. 25, Paris, France, Apr. 2002, pp. 1-23.

3rd Generation Partnership Project, "Draft minutes of TSG RAN WG1 #26 meeting," R1-02-0860, TSG-RAN Working Group 1 meeting No. 27, Oulu, Finland, Jul. 2002, pp. 1-37.

3rd Generation Partnership Project, "Draft minutes of TSG RAN WG1 #27 meeting," R1-02-1020, TSG-RAN Working Group 1 meeting No. 28, Seattle, USA, Aug. 2002, pp. 1-35.

3rd Generation Partnership Project, "Meeting No. 2 minutes (Draft)," TSGR1#2(99)136, TSG-RAN Working Group 1(Radio) meeting #2, Yokohama, Japan, Feb. 22-25, 1999, pp. 1-42.

3rd Generation Partnership Project, "Minutes of TSG-RAN WG1 #22 TDD Ad Hoc Meeting," R1-01-1321, TSG-RAN WG1 #22 TDD Ad Hoc, Nov. 21, Jeju, Korea, pp. 1-6.

3rd Generation Partnership Project, "Presentation of Specification to TSG or WG," R2-011508, TSG-RAN Meeting #11, TR 25.855 Version 1.0.0 (Jun. 2001).

3rd Generation Partnership Project, "Revised minutes of RAN WG1 Rel-5 Ad Hoc meeting," R1-01-0885, 3GPP TSG RAN WG 1, Aug. 27-31, Turin, Italy, pp. 1-24.

3rd Generation Partnership Project, "Revised minutes of RAN WG1 #19 meeting," R1-01-0435, 3GPP TSG RAN WG 1, Pusan, Korea, May 21-25, pp. 1-41.

3rd Generation Partnership Project, "Revised minutes of TSG RAN WG1 #23 meeting," R1-02-0356, TSG-RAN Working Group 1 meeting No. 24, Orlando, USA, Feb. 2002, pp. 1-30.

3rd Generation Partnership Project, "Revised minutes of TSG RAN WG1 #24 meeting," R1-02-0628, TSG-RAN Working Group 1 meeting No. 25, Paris, France, Apr. 2002, pp. 1-45.

3rd Generation Partnership Project, "Revised minutes of TSG RAN WG1 #25 meeting," R1-02-0791, TSG-RAN Working Group 1 meeting No. 25, Paris, France, Apr. 2002, pp. 1-23.

3rd Generation Partnership Project, "Revised minutes of TSG RAN WG1 #26 meeting," R1-02-0927, TSG-RAN Working Group 1 meeting No. 27, Oulu, Finland, Jul. 2002, pp. 1-37.

3rd Generation Partnership Project, "Revised minutes of TSG RAN WG1 #27 meeting," R1-02-1022, TSG-RAN Working Group 1 meeting No. 28, Seattle, USA, Aug. 2002, pp. 1-35.

3rd Generation Partnership Project, "Technical Specification Group Radio Access Network: Feasibility Study on Uplink Enhancements for UTRA TDD (Release 6)," 3GPP TS 25.804 V0.0.1 (Sep. 2003), pp. 1-11.

3rd Generation Partnership Project, "Technical Specification Group Radio Access Network: MAC protocol specification (Release 5)," 3GPP TS 25.321 V5.2.0 (Sep. 2002), pp. 1-53.

3rd Generation Partnership Project, "Technical Specification Group Radio Access Network: Radio Link Control (RLC) protocol specification (Release 5)," 3GPP TS 25.322 V5.2.0 (Sep. 2002), pp. 1-76.

3rd Generation Partnership Project, "Technical Specification Group Radio Access Network: Radio Resource Control (RRC); Protocol Specification (Release 1999)," 3GPP TS 25.331 V3.12.0 (Sep. 2002), pp. 1-845.

3rd Generation Partnership Project, "Technical Specification Group Radio Access Network: Multiplexing and channel coding (TDD) (Release 4)," 3GPP TS 25.222 V4.5.0 (Sep. 2002).

3rd Generation Partnership Project, "Technical Specification Group Radio Access Network: Multiplexing and channel coding (TDD) (Release 5)," 3GPP TD 25.222 V5.2.0 (Sep. 2002), pp. 1-66.

(56) References Cited

OTHER PUBLICATIONS

3rd Generation Partnership Project, "Technical Specification Group Radio Access Network: Packet Data Convergence Protocol (PDCP) Specification (Release 5)," 3GPP TS 25.323 V5.2.0 (Sep. 2002), pp. 1-22.

3rd Generation Partnership Project, "Technical Specification Group Radio Access Network: Physical channels and mapping of transport channels onto physical channels (TDD) (Release 5)," 3GPP TS 25.221 V5.2.0 (Sep. 2002), pp. 1-97.

3rd Generation Partnership Project, "Technical Specification Group Radio Access Network: Physical Layer Procedures (TDD) (Release 5)," 3GPP TS 25.224 V5.2.0 (Sep. 2002), pp. 1-45.

3rd Generation Partnership Project, "Technical Specification Group Radio Access Network: Spreading and modulation (TDD) (Release 5)," 3GPP TS 25.223 V5.2.0 (Dec. 2002), pp. 1-36.

3rd Generation Partnership Project, "Technical Specification Group Radio Access Network: High Speed Downlink Packet Access (HSDPA), Overall description, Stage 2 (Release 5)," 3GPP TS 25.308 V5.2.0 (Mar. 2002), pp. 1-30.

3rd Generation Partnership Project, "Technical Specification Group Radio Access Network: Radio Interface Protocol Architecture (Release 5)," 3GPP TS 25.301 V5.2.0 (Sep. 2002), pp. 1-43.

3rd Generation Partnership Project, "Technical Specification Group Radio Access Network: Services provided by the physical layer (Release 5)," 3GPP TS 25.302 V5.2.0 (Sep. 2002), pp. 1-63.

3rd Generation Partnership Project, "Technical Specification Group Radio Access Network; Feasibility Study for Enhanced Uplink for UTRA FDD; (Release 6)," 3GPP TS 25.896 V1.0.0 (Sep. 2003), pp. 1-63.

3rd Generation Partnership Project, "Technical Specification Group Radio Access Network; UTRAN Overall Description (Release 5)," 3GPP TS 25.401 V5.4.0 (Sep. 2002), pp. 1-44.

3rd Generation Partnership Project, "Third Generation Partnership Project, Technical Specification Group Radio Access Network: Physical channels and mapping of transport channels onto physical channels (TDD) (Release 4)," 3GPP TS 25.221 V4.6.0 (Sep. 2002).

3rd Generation Partnership Project, "TR 25.855 v 0.0.3," R2-010987, 3GPP TSG RAN WG2 #20, Hayama, Japan, Apr. 9-13, 2001, pp. 1-23.

3rd Generation Partnership Project, "TR 25.855 v 0.0.4," R2-011132, 3GPP TSG RAN WG2 #20, Busan, Korea, May 21-25, 2001, pp. 1-23.

3rd Generation Partnership Project, "TR 25.858 v 0.0.4," R1-01-0989, 3GPP TSG RAN WG1 #21, Espoo, Finland, Jun. 25-27, 2001, p. 1-14.

3rd Generation Partnership Project, "TR25.848: TR on Physical Layer Aspects of UTRA High Speed Downlink Packet Access v0.3.0m," R1-01-0117, 3GPP TSG RAN WG1 meeting #18, Boston, USA, Jan 15-18, 2001, pp. 1-58.

3rd Generation Partnership Project, Draft TR on "Feasibility Study for analysis of OFDM for UTRAN enhancement," R1-02-0931, 3GPP TSG-RAN Working Group 1 #27, Oulu, Finland, Jul. 2002, pp. 1-13.

3GPP, "Draft Report of 3GPP TSG RAN WG1 #30 meeting (San Diego CA, USA, Jan. 7-10, 2003)," Tdoc R1-030613, 3GPP TSG RAN WG1 meeting #32, Marne la Vallee, France, May 19-23, 2003.

3GPP Meeting Registration—List of Registered Attendees, Meeting 3GPPRAN1-#28 BIS ("Attendees of Meeting #28 BIS").

3GPP Meeting Registration—List of Registered Attendees, Meeting 3GPPRAN1-#29 BIS ("Attendees of Meeting #29 BIS").

3GPP Meeting Registration—List of Registered Attendees, Meeting 3GPPRAN1-#30 BIS ("Attendees of Meeting #30 BIS").

3GPP Meeting Registration—List of Registered Attendees, Meeting 3GPPRAN1-#31 BIS ("Attendees of Meeting #31 BIS").

3GPP Meeting Registration—List of Registered Attendees, Meeting 3GPPRAN1-#32 BIS ("Attendees of Meeting #32 BIS").

3GPP Meeting Registration—List of Registered Attendees, Meeting 3GPPRAN1-#33 BIS ("Attendees of Meeting #33 BIS").

3GPP Meeting Registration—List of Registered Attendees, Meeting 3GPPRAN1-#34 BIS ("Attendees of Meeting #34 BIS").

3GPP Meeting Registration—List of Registered Attendees, Meeting 3GPPRAN1-#35 BIS ("Attendees of Meeting #35 BIS").

Baier et al., "Design Study for a CDMA-Based Third-Generation Mobile Radio System," IEEE Journal on Selectred Areas in Communications, vol. 12, No. 4, p. 733-743 (IEEE May 1994).

Barrett, "Email from Stephen Barrett to 3GPP_TSG RAN_WG2, dated Feb. 3, 1999, regarding [USCH]email discussion group." Feb. 3, 1999, pp. 1-2.

Brasche et al., "Concepts, Services, and Protocols of the New GSM Phase 2+ General Packet Radio Service," pp. 94-104 (Aug. 1997).

Ericsson et al., "Uplink Enhancements for Dedicated Transport Channels," RP-020658, TSG-RAN Meeting #17, Biarritz, France, Sep. 3-6, 2002.

Ericsson, "Associated downlink signaling," TSG-RAN WG1/2 HSDPA Ad Hoc, 12A010059, Antipolis, France, Nov. 5, 2001, pp. 1-7.

Ericsson, "Downlink control signaling for HSDPA (update of R1-01-0888)," R1-01-0937, 3GPP TSG RAN WG1 meeting #21, Torino, Italy, Aug. 27-31, 2001, pp. 1-3.

Ericsson, "Downlink control signaling for HSDPA," R1-01-0889, 3GPP TSG RAN WG1 meeting #21, Aug. 27-31, 2001, Turin, Italy, pp. 1-4.

Ericsson, "HS-DSCH-related downlink signaling (text proposal for TR) (revision of R1-01-0962)," R1-01-0970, 3GPP TSG RAN WG1 meeting #21, Torino, Italy, Aug. 27-31, 2001, pp. 1-3.

Ericsson, "HS-DSCH-related downlink signaling (text proposal for TR)," R1-01-0962, 3GPP TSG RAN WG1 meeting #21, Torino, Italy, Aug. 27-31, 2001, pp. 1-3.

Ericsson, "Shared control channel, detailed structure (revision of R1-01-1115)," R1-01-1051, 3GPP TSG RAN1 #22, Nov 19-23, 2001, Cheju, Korea, pp. 1-3.

Ericsson, "Shared control channel, detailed structure," R1-01-1115, 3GPP TSG RAN1 #22, Nov. 19-23, 2001, Cheju, Korea, pp. 1-2.

ETSI TS 125 401 V5.6.0 (Jun. 2003), Universal Mobile Telecommunications System (UMTS), UTRAN overall description (3GPP TS 25.401 version 5.6.0 Release 5), Jun. 2003.

Ghosh, "Email from Amitava Ghosh to 3GPP TSG RAN WG1: TSG RAN Working Group 1, dated Feb. 16, 1999, regarding Shared Channel Information," Feb. 16, 1999, pp. 1-2.

Ghosh, "Email from Amitava Ghosh to 3GPP TSG RAN WG1: TSG RAN Working Group 1, dated Mar. 17, 1999, regarding Ad Hoc 14: Packet Mode Operation," Mar. 17, 1999, pp. 1-3.

Ghosh, "Email from Amitava Ghosh to 3GPP TSG RAN WG1: TSG RAN Working Group 1, dated Mar. 19, 1999, regarding Adhoc#14 Summary of e-mail discussion," Mar. 19, 1999, pp. 1-19.

Ghosh, "Email from Amitava Ghosh to 3GPP TSG RAN WG1: TSG RAN Working Group 1, dated Mar. 4, 1999, regarding Ad Hoc 14: Packet Mode Operation," Mar. 4, 1999, pp. 1-4.

Gitlin et al., Data Communications Principles, Plenum Press, 1st Ed. (1992), pp. 1-733.

Golden Bridge Technology, Inc., "Downlink Common Control Channel (A WP-CDMA feature)," Tdoc RAN WG2 097/99, 3GPP-TSG RAN WG2 #2, Mar. 8-11, 1999, Stockholm, Sweden.

IMST, "Multi Mode Radio," IST-2001-34561, 2001, p. 1.

Interdigital et al., "Text proposal on Reference Techniques in Earlier Releases and HARQ as Candidate Technique for TDD UL Enhancements," R1-040176, TSG RAN WG1 #36 meeting, Malaga, Spain, Feb. 2004, pp. 1-14.

Interdigital, "16 bit UE ID based UE specific masking for HS-SCCH," R1-02-0715, 3GPP TSG RAN WG1#26, Kyung-Ju, Korea, May 2002, pp. 1-10.

Interdigital, "CR 25.212-145 (Rel-5): UE specific masking for HS-SCCH part1," R1-02-0717, 3GPP TSG-RAN WG1 Meeting #26, Gyeongju, Korea, May 2002, pp. 1-2.

Interdigital, "CR 25.212-145r1 (Rel-5): UE specific masking for HS-SCCH part1," R1-02-0830, 3GPP TSG-RAN WG1 Meeting #26, Gyeongju, Korea, May 2002, pp. 1-2.

Interdigital, "CR 25.212-145r2 (Rel-5): UE specific masking for HS-SCCH part1," R1-02-0843, 3GPP TSG-RAN WG1 Meeting #26, Gyeongju, Korea, May 13-17, 2002, pp. 1-5.

Interdigital, "CR 25.212-145r4 (Rel-5): UE specific masking for HS-SCCH part1," R1-02-0858, 3GPP TSG-RAN WG1 Meeting #26, Gyeongju, Korea, May 13-17, 2002, pp. 1-6.

(56) References Cited

OTHER PUBLICATIONS

Interdigital, "CR 25.212-145r5 (Rel-5): UE specific masking for HS-SCCH part1," R1-02-0859, 3GPP TSG-RAN WG1 Meeting #26, Gyeongju, Korea, May 13-17, 2002, pp. 1-7.
Interdigital, "CR 25.212-145 (Rel-5): UE specific masking for HS-SCCH part1," R1-02-0821, 3GPP TSG-RAN WG1 Meeting #26, Gyeongju, Korea, May 13-17, 2002, pp. 1-3.
Interdigital, "16 bit UE ID Based UE Specific Masking for HS-SCCH: Updated for consistency with new Rate matching for HS-SCCH," R1-02-0941, 3GPP TSG RAN WG1#27, Oulu, Finland, Jul. 2-5, 2002, pp. 1-2.
Interdigital, "Discussion on UE specific masking for HS-SCCH," R1-02-0716, 3GPP TSG RAN WG1#26, Gyeongju, Korea, May 2002, pp. 1-2.
Interdigital, "HS-SCCH signalling for 3.84 MCPS TDD," R1-02-0224, 3GPP TSG RAN WG1#23, Orlando, USA, Feb. 18-21, 2002, pp. 1-5.
Interdigital, "HS-SCCH signalling for FDD HSDPA," R1-02-0226, 3GPP TSG RAN WG1#23, Orlando, USA, Feb. 18-21, 2002, pp. 1-10.
Interdigital, "Review of email discussion on UE-specific CRC," R1-01-1065, 3GPP TSG RAN WG 1, Sophia Antipolis, France, Nov. 5-7, 2001, pp. 1-6.
Interdigital, "Simplified Illustration of the performance benefit of UE dependent CRC," R1-01-0972, 3GPP TSG RAN WG 1, Torino, Italy, Aug. 27-31, 2001, pp. 1-3.
Interdigital, "TDD HSDPA Uplink Signaling," R2-011057, TSG-RAN Working Group 2 Meeting #xx, Pusan, Korea, May 21-25, 2001, pp. 1-4.
Ipwireless et al., "CR25.222-091r1(Rel-5): HS-SCCH Corrections for TDD," R1-02-1094, 3GPP TSG-RAN WG1 Meeting #28, Seattle, USA, Aug. 19-22, 2002, pp. 1-8.
Ipwireless, "Allocation of Shared Resources: Text Proposal for TR 25.804," R1-031064, 3GPP TSG RAN WG1#34, Seoul Korea, Oct. 6-10, 2003, pp. 1-4.
Ipwireless, "Allocation of Shared Resources: Text Proposal for TR 25.804," R1-031291, 3GPP TSG RAN WG1#35, Lisbon, Portugal, Nov. 17-21, 2003, pp. 1-4.
Ipwireless, "Comments on proposals to restrict the OFDM study item to FDD Only," R1-02-1166, 3GPP TSG-RAN WG1 #28, Seattle, USA, Aug. 19-22, 2002, pp. 1-3.
Ipwireless, "CR 25.222-091 (Rel-5): HS-SCCH Corrections for TDD," R1-02-1019, 3GPP TSG-RAN WG1 Meeting #28, Seattle, USA, Aug, 19-22, 2002.
Juergen, "Email from Michel Juergen to 3GPP_TSG_RAN WG1: TSG RAN Working Group 1, regarding Siemens contributions for next RAN 1 meeting, dated Jan. 2, 2003," Jan. 2, 2003, p. 1.
LG Electronics, "On user-specific scrambling code for the part 1 of HS-SCCH," R1-02-0542, 3GPP TSG RAN WG1 #25, Paris, France, Apr. 9-12, 2002, pp. 1-5.
Lin et al., Error Control Coding: Fundamentals and Applications, 1983.
Lucent Technologies, "Comparison of schemes for UE specific CRC," R1-02-0076, 3GPP TSG-RAN WG1#23, Espoo, Finland, Jan. 8-11, 2002, pp. 1-3.
Lucent Technologies, "Downlink model for HSDPA," R1-01-0312, 3GPP TSG RAN WG 1, Las Vegas, USA Feb. 26-Mar. 2, 2001, pp. 1-4.
Lucent Technologies "Code limitation and code reuse in HSDPA," R1-02-1255, 3GPP TSG-RAN, Espoo, Finland, Oct. 8-9, 2002, pp. 1-10.
Lucent Technologies, "Code limitation and code reuse in HSDPA," R1-02-1238, 3GPP TSG-WG1#28, Espoo, Finland, Oct. 8-9, 2002, pp. 1-6.
Lucent Technologies, "Code limitation and code reuse in HSDPA," R1-02-1371, 3GPP TSG-RAN1 #29, Shanghai, China, Nov. 5-8, 2002, pp. 1-10.
Lucent Technologies, "Code reuse in HSDPA," R1-02-1149, 3GPP TSG-RAN WG1#28, Seattle, USA, Aug. 19-22, 2002, pp. 1-5.

Lucent Technologies, "Coding for the shared control channel (HS-SCCH)," R1-01-1061, 3GPP TSG RAN WG 1, Nov. 19-23, 2001, JeJu, Korea, pp. 1-7.
Lucent Technologies, "Enhancing the Uplink DCH—Adaptive Modulation and Coding," R1-02-1323, 3GPP TSG-RAN1 #29, Shanghai, China, Nov. 5-8, 2002, pp. 1-5.
Lucent Technologies, "Enhancing the Uplink DSCH—Scheduling options," R1-02-1322, 3GPP TSG-RAN1 #29, Shanghai, China, Nov. 5-8, 2002, pp. 1-7.
Lucent Technologies, "False alarm performance of various UE ID coding, scrambling and CRC schemes," R1-02-0723, 3GPP TSG-RAN WG1#26, Gyeongju, Korea, May 13-16, 2002, pp. 1-5.
Lucent Technologies, "Fast (MAC-hs) Signalling in HSDPA," R1-02-0908, 3GPP TSG-RAN WG1#27, Oulu, Finland, Jul. 2-5, 2002, pp. 1-4.
Lucent Technologies, "Pre-coding of UE ID before modulo 2 addition with CRC," R1-02-0555, 3GPP TSG-RAN WG1#25, Paris, France, Apr. 9-12, 2002, pp. 1-8.
Lucent Technologies, "Signalling for H-ARQ Operation," R1-030285, 3GPP TSG-WG1#31, Tokyo, Japan, Feb. 18-21, 2003, pp. 1-5.
Lucent Technologies, "UE procedures (HS-SCCH) to support HSDPA enhancements," R1-02-0904, TSG-RAN WG1#27, Oulu, Finland, Jul. 2-5, 2002, pp. 1-2.
Lucent Technologies, "Way forward on HS-SCCH coding," R1-02-553, 3GPP TSG-RAN WG1#25, Paris, France, Apr. 9-12, 2002, pp. 1-6.
Motorola et al., "Text Proposal: DL signalling overview," R1-031139, TSG-RAN WG1 #35 meeting, Lisbon, Portugal, Nov. 17-21, 2003, pp. 1-2.
Motorola et al., "Text Proposal: DL signalling overview," R1-031173, TSG-RAN WG1 #35 meeting, Lisboa, Portugal, Nov. 17-21, 2003, pp. 1-2.
Motorola, "Associated Signaling Requirements for High Speed DSCH (HS-DSCH)," R1-01-0542, 3GPP TSG RAN WG 1, Busan, Korea, May 21-25, 2001, pp. 1-4.
Motorola, "Benefits of the ACCH for signaling fast assignments," SMG2 UMTS-L1 047/99, Helsinki, Finland, Jan. 18-20, 1999, pp. 1-2.
Motorola, "Benefits of the Uplink Shared Channel (USCH)," 032/99, Helsinki, Finland, Jan. 20-22, 1999, pp. 1-8.
Motorola, "Change requests to the Uplink Shared Channel (USCH)," 033/99, Helsinki, Finland, Jan. 20-22, pp. 1-5.
Motorola, "Channel Bandwidth Allocation Strategy," SMG2 UMTS-L1 682/98, Espoo, Finland, Dec. 14-18, 1998, pp. 1-4.
Motorola, "Downlink Control Channel Signaling for Enhanced Uplink: New DPCCH," R1-030478, 3GPPRAN1#32, Paris, France, May 19-23, 2003, pp. 1-2.
Motorola, "Downlink Control Channel Signaling for Enhanced Uplink: New DPCCH," R1-031043, 3GPPRAN1#34, Seoul, Korea, Oct. 6-11, 2003, pp. 1-2.
Motorola, "High Speed Downlink Packet Access (HSDPA)—Overall Description," R1-01-0787, 3GPP TSG RAN WG 1 #21, Turin, Italy, Aug. 27-31, 2001, pp. 1-14.
Motorola, "Mechanisms for managing uplink interference and bandwidth," SMG2 UMTS-L1 683/98, Espoo, Finland, Dec. 14-18, 1998, pp. 1-6.
Motorola, "Methods for Operating the Uplink Shared Channel," SMG2 UMTS-L1 046/99, Helsinki, Finland, Jan. 18-20, 1999, pp. 1-4.
Motorola, "Operation of the Uplink Shared Channel," TSGR1#2(99)064, Yokohama, Japan, Feb. 22-25, 1999, pp. 1-9.
Motorola, "Overview of the Enhanced Uplink Proposal," R1-030476, 3GPPRAN1#32, Paris, France, May 19-23, 2003, pp. 1-4.
Motorola, "Performance of SCCH-HS with various coding options," R1-02-0035, TSG-RAN Working Group 1#23, Espoo, Finland, Jan. 8-11, 2001, pp. 1-9.
Motorola, "Performance of SCCH-HS with various coding options," R1-02-0039, TSG-RAN Working Group #23, Espoo, Finland, Jan. 8-11, 2001, pp. 1-8.

(56) References Cited

OTHER PUBLICATIONS

Motorola, "Performance of the HS-SCCH with different code rates," R1-02-0718, TSG RAN WG1 meeting #26, GyeongJu, Korea, May 13-16, 2002, pp. 1-4.
Motorola, "Physical Layer structure/Multiplexing Alternatives: Text Proposal," R1-030482, 3GPPRAN1#32, Paris, France, May 19-23, 2003, pp. 1-3.
Motorola, "Shared Channel Options for Downlink Packet Data Transmission," SMG2 UMTS-L1 681/98, Espoo, Finland, Dec. 14-18, 1998, pp. 1-4.
Motorola, "Shared Channels for Packet Data Transmission in W-CDMA," TSGR1#2(99)081, Yokohama, Japan, Feb. 22-25, 1999, pp. 1-36.
Motorola, "State Occupancy Estimations for Shared Channel Concept," TSGR1#2(99)066, Yokohama, Japan, Feb. 22-25, 1999, pp. 1-6.
Motorola, "Timing of the Uplink Shared Channel," TSGR1#2(99)065, Yokohama, Japan, Feb. 22-25, 1999, pp. 1-5.
Motorola, "Uplink enhancements for dedicated transport channels," R1-02-1250, 3GPP TSG RAN WG1, Espoo, Finland, Oct. 8-9, 2002, pp. 1-3.
Motorola, "Way Forward on HS-SCCH," R1-02-0463, TSG RAN WG1 meeting #24, Orlando, USA, Feb. 18-22, 2002, pp. 1-2.
Motorola, "Incorporation of ETSI shared channel concepts in 3GPP documentation," 3GPP/RAN/WG2 02/99, Helsinki, Finland, Jan. 20-22, 1999, pp. 1-3.
Nokia, "DL control channel structures for parameters sent before HS-DSCH TTI," R1-01-0549, 3GPP TSG RAN WG 1, Busan, Korea, May 21-25, 2001, pp. 1-4.
Nokia, "DL control channel structures for parameters sent simultaneously with HS-DSCH TTI," R1-01-0550, 3GPP TSG RAN WG 1, Busan, Korea, May 21-25, 2001, pp. 1-4.
Nokia, "DL physical channel structure," R1-030177, TSG-RAN WG1 #31 meeting, Tokyo, Japan, Feb. 18-21, 2003, pp. 1-2.
Nokia, "Downlink physical channel structure," R1-030735, TSG-RAN WG1 #33 meeting, New York City, USA, Aug. 25-29, 2003, pp. 1-2.
Nokia, "Downlink physical channel structure," Tdoc R1-031034, TSG-RAN WG1 #34 meeting, Seoul, Korea, Oct. 6-10, 2003, pp. 1-2.
Nokia, "Enhanced Uplink DCH—Email Discussion Summary," R1-030272, TSG-RAN WG1 #31 meeting, Tokyo, Japan, Feb. 18-21, 2003, pp. 1-4.
Nokia, "HSDPA DL channel structure," R1-01-0827, 3GPP TSG RAN WG 1, Turin, Italy, Aug. 27-31, 2001, pp. 1-4.
Nokia, "Downlink physical channel structure," R1-030398, TSG-RAN WG1 #32 meeting, Paris, France, May 19-23, 2003, pp. 1-2.
Nortel et al., "Stand-alone DSCH, proposed text for inclusion in TR 25.848 v 0.4.0," R1-01-0203, 3GPP TSG RAN WG 1, Las Vegas, USA, Feb. 27-Mar. 3, 2001, pp. 1-10.
Nortel Networks et al., "Modified Study Item description on Analysis of OFDM for UTRAN enhancement," R1-02-0930, TSG-RAN Working Group1 meeting #27, Oulu, Finland, Jun. 2-5, 2002, pp. 1-4.
Nortel Networks et al., "Revised Study Item description on Analysis of OFDM for UTRAN enhancement," R1-02-1168, 3GPP TSG RAN1#28, Seattle, USA, Aug. 19-22, 2002, pp. 1-4.
Nortel Networks et al., "Revised Text proposal for section 3 & 4 of TR 25.892," R1-02-1434, 3GPP TSG-RAN1 #29, Shanghai, China, Nov. 5-8, 2002, pp. 1-11.
Nortel Networks, "UE specific CRC for HS-DSCH," R1-030229, 3GPP TSG-RAN1 Meeting #31, Tokyo, Japan, Feb. 18-21, 2003, pp. 1-2.
Nortel Networks, "Initial simulation results on OFDM in UTRAN," R1-02-1306, 3GPP TSG-RAN1 #29, Shanghai, China, Nov. 5-8, 2002, pp. 1-10.
Nortel Networks, "Further comments on the scope of the OFDM study item," R1-02-1030, TSG-RAN Working Group1 meeting #28, Seattle, USA. Aug. 19-20, 2002, pp. 1-2.
Nortel Networks, "Introduction and benefits of OFDM," R1-02-1029, 3GPP TSG-RAN-1 Meeting #28, Seattle, USA, Aug. 19-22, 2002, pp. 1-3.
Nortel Networks, "OFDM SI simulation methodology," R1-02-1305, 3GPP TSG-RAN-1 Meeting #29, Shanghai, China, Nov. 5-8, 2002, pp. 1-18.
Nortel Networks, PPT presentation of "Reference OFDM Physical Layer Configuration," R1-02-1223, 3GPP TSG-RAN 1 Meeting #28 bis, Espoo, Finland, Oct. 8-9, 2002, pp. 1-11.
Nortel Networks, "Proposed baseline for OFDM parameter set," R1-02-1399, 3GPP TSG-RAN1 #29, Shanghai, China, Nov. 5-8, 2002, pp. 1-3.
Nortel Networks, "Reference OFDM physical layer configuration," R1-02-1184, 3GPP TSG-RAN 1 Meeting #28, Seattle, USA, Aug. 19-22, 2002, pp. 1-11.
Nortel Networks, "Reference OFDM physical layer configuration," R1-02-1222, 3GPP TSG-RAN-1 Meeting #28, Espoo, Finland, Oct. 8-9, 2002, pp. 1-12.
Nortel Networks, "Reference OFDM physical layer configuration," R1-02-1028, 3GPP TSG-RAN-1 Meeting #8, Seattle, USA, Aug. 19-22, 2002, pp. 1-12.
Nortel Networks, "Revised Study Item description on Analysis of OFDM for UTRAN enhancement," R1-02-1023, 3GPP TSG RAN1#28, Seattle, USA, Aug. 19-22, 2002, pp. 1-4.
Nortel Networks, "Text proposal for OFDM parameter set," R1-02-1400, 3GPP TSG-RAN1 #29, Shanghai, China, Nov. 5-8, 2002, pp. 1-3.
Nortel Networks, "Text proposal for section 3 & 4 of TR 25.892," R1-02-1307, 3GPP TSG-RAN1 #29, Shanghai, China, Nov. 5-8, 2002, p. 1-11.
Nortel Networks, "Enhanced HS-DPCCH power control in soft handover," R1-020929, TSG-RAN Working Group 1 meeting #27, Oulu, Finland, Jul. 2-5, 2002.
Nortel, "Assumptions and objectives for 'Analysis of OFDM in URAN enhancement' Study Item," R1-02-0932, TSG-RAN Working Group1 meeting #27, Oulu, Finland, Jul. 2-5, 2002, pp. 1-2.
Nortel, "Revised draft TR on Feasibility Study for analysis of OFDM for UTRAN enhancement," R1-02-1257, 3GPP TSG RAN1#29, Shanghai, China, Nov. 5-8, 2002, pp. 1-11.
Panasonic, "Clarification to the Blind transport format detection," R1-010058, TSG RAN WG1 Meeting #18, Boston, USA, Jan. 15-18, 2001, pp. 1-7.
Panasonic, "Downlink physical channel structure reusing AICH or PICH for E-DCH DL signalling (Resubmission of R1-030790)," R1-030994, 3GPP TSG-RAN WG1 Meeting #34, Seoul, Korea, Oct. 6-10, 2003, pp. 1-5.
Panasonic, "Downlink physical channel structure reusing AICH or PICH for E-DCH DL signalling," R1-030790, 3GPP TSG-RAN WG1 Meeting #33, New York City, Aug. 25-29, 2003, pp. 1-5.
Panasonic, "Downlink physical channel structure reusing AICH or PICH," R1-030493, 3GPP TSG-RAN WG1 Meeting #32, Paris, France, May 19-23, 2003, pp. 1-3.
Panasonic, "Uplink control channel for HSDPA," R1-01-0843, 3GPP TSG RAN WG 1, Helsinki, Finland, Aug. 27-31, 2001, pp. 1-5.
Passas, "MAC protocol and traffic scheduling for wireless ATM networks," Mobile Networks and Applications 3, Baltzer Science Publishers BV (1998), pp. 275-292.
Pollakowski, Email from Pollakowski Olaf to 3GPP_TSG_RAN_WG1: TSG RAN Working Group 1, dated Apr. 3, 2001, regarding "Siemens contributions for the HSDPA Ad Hoc," Apr. 3, 2001, pp. 1-2.
Proakis, Digital Communications, McGraw-Hill, 3rd Ed. (1995), pp. 1-898.
Qualcomm, "Channel structure for consideration in Enhanced Uplink," R1-030273, 3GPP TSG RAN WG1 #31, Tokyo, Japan, Feb. 18-21, 2003, pp. 1-6.
Qualcomm, "DL HSDPA control structure," R1-01-1254, 3GPP TSG RAN WG1 #22, Nov. 19-23, 2001, Jeju, Korea, pp. 1-8.
Qualcomm, "DL HSDPA control structure," R1-01-1262, 3GPP TSG RAN WG1 #22, Nov. 19-23, 2001, Jeju, Korea, pp. 1-9.
Qualcomm, "Enhanced Uplink DPCH Rates & Coding for Consideration," R1-030275, 3GPP TSG RAN WG1 #31, Tokyo, Japan, Feb. 2003, pp. 1-5.
Qualcomm, "Multiplexing alternatives for considerations in EUL SI," R1-030274, 3GPP TSG-RAN1 #31, Tokyo, Japan, Feb. 18-21, 2003, pp. 1-4.

(56) References Cited

OTHER PUBLICATIONS

Qualcomm, "On HSDPA DL structure," R1-01-0624, TSG-RAN WG1 #20, Busan, Korea, May 21-25, 2001, pp. 1-5.
Rapporteur, "Revised Draft TR on Feasibility Study for Enhanced Uplink for UTRA FDD," R1-030148, 3GPP TSG RAN1#30, San Diego, USA, Jan. 7-10, 2002, pp. 1-32.
Redl et al., An Introduction to GSM, Artech House Publishers (1995).
Samsung and Philips, "Text Proposal for Channel assignment in CPCH," TSGR1#7bis(99)f50, 3GPP TSG RAN Working Group 1 meeting No. 7bis, Kyongju, South Korea, Oct. 4-5, 1999, pp. 1-10.
Samsung, "An efficient signaling on SCCH-HS and channel coding of SCCH-HS," R1-02-0051, TSG-RAN Working Group 1 Meeting #23, Espoo, Finland, Jan. 8-11, 2002, pp. 1-9.
Samsung, "DL signalling for HSDPA," R1-01-0874, 3GPP TSG RAN WG 1 Meetimg #21, Turin, Italy, Aug. 27-31, 2001, pp. 1-10.
Samsung, "UE Specific CRC & Tail bit for HS-SCCH," R1-02-0390, 3GPP TSG-RAN WG1 #24, Orlando, USA, Feb. 18-22, 2002, pp. 1-3.
Siemens Ag et al., "TS 25.321 CR," R2-99941, 3GPP TSG RAN meeting #6, Sophia Antipolis, France, Aug. 16-20, 1999, pp. 1-7.
Siemens et al., "Investigation of FDD/TDD alignment possibilities for HSDPA," R2-011276, 3GPP TSG RAN WG2 #21, Busan, Korea, May 21-25, 2001, pp. 1-10.
Siemens et al., "Proposed Update to Physical Channel Model and Signaling Requirements for TDD HSDPA TR 25.855," R2-011705, TSG-RAN Working Group 2 Meeting #22, Berlin, Germany, Jul. 9-13, 2001, pp. 1-7.
Siemens et al., "Text Proposal for TDD Sections of TR 25.858," R1-02-0510, 3GPP TSG RAN WG1#24, Orlando, Florida, Feb. 18-22, 2002, pp. 1-13.
Siemens AG, "CR 25.212-XXX (Rel-5): Simplification of HS-SCCH part1 rate matching," R1-02-0934, 3GPP TSG-RAN WG 1 Meeting #27, Oulu, Finland, Jul. 2002, pp. 1-6.
Siemens, "CR25.212-132 (Rel-5): Rate matching and channel coding for HS-SCCH," R1-02-0605, 3GPP TSG-RAN1 Meeting #25, Paris, France, Apr. 9-12, 2002, pp. 1-5.
Siemens, "Discussion on channel coding schemes for the physical downlink shared control channel (HS-SHCCH)," R1-01-1131, 3GPP TSG RAN Working Group 1 meeting #22, Nov. 19-23, 2001, Jeju, Korea, pp. 1-8.
Siemens, "EUDTCH Considerations," R1-030023, 3GPP TSG-RAN WG1#30, San Diego, USA, Jan. 7-10, 2003, pp. 1-4.
Siemens, "HSDPA Signalling Requirements for TDD Mode," TSGR2#19 R2-010715, TSG-RAN Working Group2 meeting#19, Sophia Antipolis, France, Feb. 19-23, 2001, pp. 1-7.
Siemens, "MAC architecture model for HSDPA," TSG-RAN WG1/2 Adhoc, TSGAHR1R2#A010011, Sophia Antipolis, France, Apr. 5-6, 2001, pp. 1-6.
Siemens, "Physical Layer Considerations for the Signalling Channels associated to the HS-DSCH in TDD," 12A010019, 3GPP TSG-RAN WG1/2 Joint Meeting on HSDPA, Sophia Antipolis, France, Apr. 5-6, 2001, pp. 1-2.
Siemens, "Quad-channel Stop and Wait HARQ in TDD Mode," 3GPP TSG-RAN WG1/2 Joint Meeting on HSDPA, 12A010013, Sophia Antipolis, France, Apr. 5-6, 2001, pp. 1-4.
Siemens, "RRC procedure: TDD USCH/DSCH physical resource allocation," TSGR2#7(99)b68, TSG-RAN Working Group 2, Malmo, Sep. 20-24, 1999, pp. 1-4.
Siemens, "Signalling and Data Transfer for HSDPA in TDD Mode: Modelling of Layer 1/ Layer 2 Interface," TSG-RAN WG1/2 Adhoc, 12A010012, Sophia Antipolis, France, Apr. 5-6, 2001, pp. 1-5.
Siemens, "Signalling Requirements for HSDPA in TDD Mode," TSG-RAN WG1/2, Joint Meeting on HSDPA, 12A010010, Sophia Antipolis, France, Apr. 5-6, 2001, pp. 1-3.
Siemens, "Structure of the downlink shared control channel for HSDPA," R1-01-1030, 3GPP TSG RAN WG 1, Sophia Antipolis, France, Nov. 5-7, 2001, pp. 1-4.
Siemens, "TDD HSDPA Physical Layer Model," R2-010939, 3GPP TSG RAN WG2 Meeting#20, Hayama, Japan, Apr. 9-13, 2001, pp. 1-3.
Siemens, "UE specific bit scrambling for TDD HS-SCCH," R1-02-0400, 3GPP TSG-RAN WG1#25, Paris, France, Feb. 2002, pp. 1-5.
Siemens, "UE specific CRC generation in TDD," R1-02-0298, 3GPP TSG-RAN WG1#24, Orlando, Florida, USA, Feb. 18-22, 2002, p. 1.
Siemens, "Generation of UE-specific CRC from reduced length H-RNTI" R1-030338, 3GPP TSG-RAN WG1#31, Tokyo, Japan, Feb. 18-21, 2003, pp. 1-6.
Sony Corporation, "Text proposal for associated downlink signaling on TR25.848," R1-01-0402, 3GPP TSG RAN Working Group 1 Meeting #19, Las Vegas, NV USA, Feb. 27-Mar. 2, 2001, p. 1.
Uins, "Digital Baseband Architecture Scenarios for a Multi-Mode Radio, IST-2001-34561," Oct. 31, 2002, pp. 1-63.
Wavecom et al., "Advantages of using OFDM for enhancing UTRAN," R1-02-1256, TSG-RAN WG1#28 bis, Espoo, Finland, Oct. 8-9, 2002, pp. 1-5.
Wavecom et al., "Advantages of using OFDM for enhancing UTRAN," R1-02-1229, TSG-RAN WG1#28 bis, Espoo, Finland, Oct. 8-9, 2002, pp. 1-5.
Amended Answer to Amended Complaint, In the United States District Court for the District of Delaware, C. A. No. 13-08-RGA, Apr. 30, 2013.
Answer to Amended Complaint, In the United States District Court for the District of Delaware, C.A. No. 13-08-RGA, Mar. 22, 2013.
Answer and Counterclaims, In the United States District Court for the District of Delaware, C.A. No. 13-008-RGA, Jan. 24, 2013.
Petition for Review, United States Court of Appeals for the Federal Circuit, Oct. 10, 2014.
Public Version of Commission Opinion, In the Matter of Certain Wireless Devices with 3G and/or 4G Capabilities and Components Thereof, Investigation No. 337-TA-868, Aug. 28, 2014.
Claim Construction Order, In the United States District Court for the District of Delaware, Civil Action No. 1:13-cv-00010-RGA, Mar. 13, 2015.
Memorandum Opinion, In the United States District Court for the District of Delaware, Civil Action No. 1:13-cv-00009-RGA and Civil Action No. 1:13-cv-00010-RGA, Apr. 22, 2014.
Claim Construction Order, In the United States District Court for the District of Delaware, Civil Action No. 1:13-cv-00009-RGA and Civil Action No. 1:13-cv-00010-RGA, Apr. 29, 2014.
Memorandum Opinion, In the United States District Court for the District of Delaware, Civil Action No. 1:13-cv-00009-RGA and Civil Action No. 1:13-cv-00010-RGA, Mar. 6, 2015.
The Patent Reexamination Board of the State Intellectual Property Office of the People's Republic of China, "Decision of Invalidation," Chinese Patent No. ZL200420117440.7, Nov. 30, 2012.
3rd Generation Partnership Project; Technical Specification Group Services and System Aspects Vocabulary for 3GPP Specifications (Release 6), 3GPP TR 21.905 V6.2.0 (Mar. 2003).
Declaration of Dr. Vijay K. Madisetti in Support of the Petition for Inter Partes Review of U.S. Pat. No. 7,941,151, Case No. IPR2014-00275, Dec. 30, 2013.
*Interdigital Communications, Inc. et al.* v. *Huawei Technologies et al.*, Civil Action No. 1:13-cv-00008-RGA and *Interdigital Communications, Inc. et al.* v. *ZTE Corporation et al.*, Civil Action No. 1:13-cv-00009-RGA and *Interdigital Communications, Inc. et al.* v. *Nokia Corporation et al.*, Civil Action No. 1:13-cv-00010-RGA Amended Joint Claim Construction Chart, Oct. 8, 2013.
*Interdigital Communications, Inc. et al.* v. *Huawei Technologies et al.*, Civil Action No. 1:13-cv-00008-RGA and *Interdigital Communications, Inc. et al.* v. *ZTE Corporation et al.*, Civil Action No. 1:13-cv-00009-RGA and *Interdigital Communications, Inc. et al.* v. *Nokia Corporation et al.*, Civil Action No. 1:13-cv-00010-RGA, Joint Claim Construction Brief, Nov. 14, 2013.
ITC Hearing Transcript in the Matter of Certain Wireless Devices with 3G and/or 4G Capabilities and Components Thereof, Investigation No. 337-TA-868, Feb. 11, 2014.
Joint Outline of the Issues to be Decided in the Final Initial Determination, In the Matter of Certain Wireless Devices with 3G and/or 4G Capabilities and Components Thereof, Investigation No. 337-TA-868, Mar. 7, 2014.
Order No. 94: Denying Complainants' Motion for Summary Determination That U.S. Pat. No. 7,941,151 is not Unenforceable for

(56) References Cited

OTHER PUBLICATIONS

Inequitable Conduct, In the Matter of Certain Wireless Devices with 3G and/or 4G Capabilities and Components Thereof, Investigation No. 337-TA-868, Feb. 4, 2014.
Rebuttal Witness Statement of Dr. Paul Min, In the Matter of Certain Wireless Devices with 3G and/or 4G Capabilities and Components Thereof, Investigation No. 337-TA-868, Jan. 6, 2014.
Redline of Joint Outline of the Issues to be Decided in the Final Initial Determination, In the Matter of Certain Wireless Devices with 3G and/or 4G Capabilities and Components Thereof, Investigation No. 337-TA-868, Mar. 7, 2014.
ZTE Corporation et al. v. Interdigital Technology Corporation, Petition for Inter Partes Review of U.S. Pat. No. 7,941,151, Case No. IPR2014-00275, Dec. 30, 2013.
ZTE Corporation et al. v. Interdigital Technology Corporation, Patent Owner's Preliminary Response to ZTE's Petition for Inter Partes Review of U.S. Pat. No. 7,941,151, Case No. IPR2014-00275, Apr. 17, 2014.
ZTE Corporation et al. v. Interdigital Technology Corporation, Decision Denying Institution of Inter Partes of U.S. Pat. No. 7,941,151, Case No. IPR2014-00275, Jul. 7, 2014.
Petitioners' List of Exhibits for Petition for Inter Partes Review of U.S. Pat. No. 7,941,151 (Case No. IPR2014-00275), Dec. 30, 2013.
Patent Owner's Exhibit List for Preliminary Response to ZTE's Petition for Inter Partes Review of U.S. Pat. No. 7,941,151 (Case No. IPR2014-00275), Apr. 17, 2014.
Response of ZTE Corporation and ZTE (USA) to the Complaint of InterDigital Communications, LLC Under Section 337 of the Tariff Act of 1930, As Amended, and Notice of Investigation, In the Matter of Certain Wireless Devices with 3G and/or 4G Capabilities and Components Thereof, Investigation No. 337-TA-868, Feb. 22, 2013.
3rd Generation Partnership Project; Technical Specification Group Radio Access Network; Physical channels and mapping of transport channels onto physical channels (FDD) (Release 5), 3GPP TS 25.211 V5.5.0 (Sep. 2003).
3rd Generation Partnership Project; Technical Specification Group Radio Access Network; Physical channels and mapping of transport channels onto physical channels (FDD) (Release 6), 3GPP TS 25.211 V6.1.0 (Jun. 2004).
3rd Generation Partnership Project; Technical Specification Group Radio Access Network; Spreading and modulation (FDD) (Release 5), 3GPP TS 25.213 V5.4.0 (Sep. 2003).
3rd Generation Partnership Project; Technical Specification Group Radio Access Network; Spreading and modulation (FDD) (Release 5), 3GPP TS 25.213 V5.5.0 (Dec. 2003).
Third Generation Partnership Project, "Technical Specification Group Radio Access Network; Physical Layer Procedures (TDD) (Release 4)," 3GPP TS 25.224 V4.10.0 (Dec. 2003).
Third Generation Partnership Project, "Technical Specification Group Radio Access Network; Physical layer procedures (TDD) (Release 5)," 3GPP TS 25.224 V5.7.0 (Dec. 2003).
Third Generation Partnership Project, "Technical Specification Group Radio Access Network; Physical layer procedures (TDD) (Release 6)," 3GPP TS 25.224 V6.1.0 (Jun. 2004).
Third Generation Partnership Project, "Technical Specification Group Radio Access Network; Physical layer procedures (FDD) (Release 6)." 3GPP TS 25.214 V6.2.0 (Jun. 2004).
Third Generation Partnership Project, "Technical Specification Group GSM EDGE Radio Access Network; Mobile radio interface layer 3 specification, Radio Resource Control Protocol (Release 4)," 3GPP TS 44.018 V4.3.0 (Jan. 2001).
State Intellectual Property Office of the People's Republic of China "Decision of Request for Invalidation," Chinese Patent No. 200480028878.0, Dec. 31, 2015.

* cited by examiner

DECODING NOTATION

| m | ← NUMBER OF MULTI-CODES |
| Δ | ← OFFSET FROM LEFT/RIGHT IN CODE TREE (SF=16) |

TREE OFFSET INDICATOR (4 BITS)

| CLUSTER CODE INDICATOR (3 BITS) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 (1/15) | 1,1 | 1,2 | 1,3 | 1,4 | 1,5 | 1,6 | 1,7 | 1,8 | 1,9 | 1,10 | 1,11 | 1,12 | 1,13 | 1,14 | 1,15 | |
| 1 (2/14) | 2,1 | 2,2 | 2,3 | 2,4 | 2,5 | 2,6 | 2,7 | 2,8 | 2,9 | 2,10 | 2,11 | 2,12 | 2,13 | 2,14 | 14 1 | |
| | | | | | | | | | | | | | | | 13 2 | |
| 2 (3/13) | 3,1 | 3,2 | 3,3 | 3,4 | 3,5 | 3,6 | 3,7 | 3,8 | 3,9 | 3,10 | 3,11 | 3,12 | 3,13 | 13 1 | | |
| | | | | | | | | | | | | | 12 2 | | | |
| | | | | | | | | | | | | | 13 3 | | | |
| 3 (4/12) | 4,1 | 4,2 | 4,3 | 4,4 | 4,5 | 4,6 | 4,7 | 4,8 | 4,9 | 4,10 | 4,11 | 4,12 | 12 1 | | | |
| | | | | | | | | | | | | 12 2 | | | | |
| | | | | | | | | | | | | 12 3 | | | | |
| | | | | | | | | | | | | 12 4 | | | | |
| 4 (5/11) | 5,1 | 5,2 | 5,3 | 5,4 | 5,5 | 5,6 | 5,7 | 5,8 | 5,9 | 5,10 | 5,11 | 11 1 | | | | |
| | | | | | | | | | | | 11 2 | | | | | |
| | | | | | | | | | | | 11 3 | | | | | |
| | | | | | | | | | | | 11 4 | | | | | |
| | | | | | | | | | | | 11 5 | | | | | |
| 5 (6/10) | 6,1 | 6,2 | 6,3 | 6,4 | 6,5 | 6,6 | 6,7 | 6,8 | 6,9 | 6,10 | 10 1 | | | | | |
| | | | | | | | | | | 10 2 | | | | | | |
| | | | | | | | | | | 10 3 | | | | | | |
| | | | | | | | | | | 10 4 | | | | | | |
| | | | | | | | | | | 10 5 | | | | | | |
| | | | | | | | | | | 10 6 | | | | | | |
| 6 (7/9) | 7,1 | 7,2 | 7,3 | 7,4 | 7,5 | 7,6 | 7,7 | 7,8 | 9 1 | 9 2 | 9 3 | 9 4 | 9 5 | 9 6 | 9 7 | |
| 7 (8/8) | 8,1 | 8,2 | 8,3 | 8,4 | 8,5 | 8,6 | 8,7 | 8,8 | 8 1 | 8 2 | 8 3 | 8 4 | 8 5 | 8 6 | 8 7 | 8 8 |

REDUNDANT AREA

METHOD AND SYSTEM FOR PROVIDING CHANNEL ASSIGNMENT INFORMATION USED TO SUPPORT UPLINK AND DOWNLINK CHANNELS

CROSS REFERENCE TO RELATED APPLICATION

This application is a continuation of U.S. patent application Ser. No. 11/709,970, filed Feb. 23, 2007, which is a continuation of U.S. patent application Ser. No. 10/902,740, filed Jul. 29, 2004, which issued on Apr. 3, 2007 as U.S. Pat. No. 7,200,405 which claims the benefit of U.S. Provisional Application No. 60/523,049, filed on Nov. 18, 2003, all of which are incorporated by reference as if fully set forth.

FIELD OF INVENTION

The present invention is related to a wireless communication system. More particularly, the present invention is related to a method and system for providing channel assignment information to support uplink and downlink transmissions.

BACKGROUND

High speed downlink packet access (HSDPA) has been developed to increase downlink (DL) efficiency and throughput in universal mobile telecommunication system (UMTS) Release 5 (R5) wideband code division multiple access (W-CDMA) systems. The key advantages of HSDPA as compared to UMTS R99/R4 are fast and dynamic link adaptation in the DL and a fast layer 1 hybrid automatic repeat request (H-ARQ). Fast link adaptation is achieved by fast scheduling DL transmissions in a base station, coupled with fast layer 1 DL signaling channels. The signaling channel, a high speed shared control channel (HS-SCCH), conveys radio resource allocation information to a plurality of wireless transmit/receive units (WTRUs).

In frequency division duplex (FDD), an HS-SCCH is sent by means of a spreading factor (SF)=128 channelization code during a three (3) time slot transmission time interval (TTI). The HS-SCCH indicates that data would be transmitted to a WTRU on a high speed downlink shared channel (HS-DSCH) after a particular time offset. The HS-SCCH carries the following information: 1) channelization-code-set information (7 bits); 2) modulation scheme information (1 bit); 3) transport-block size information (6 bits); 4) H-ARQ process information (3 bits); 5) redundancy and constellation version (3 bits); 6) new data indicator (1 bit); and 7) a WTRU identity (16 bits).

The HS-SCCH is sent over three (3) time slots (2 ms TTI), but consists of two (2) fields. Field 1 (first time slot) contains channelization code mapping and modulation format information; and field 2 (second and third time slots) contains transport block size, H-ARQ information, redundancy version and a new data indicator along with a WTRU-specific cyclic redundancy check (CRC).

Alternatively, an enhanced uplink (EU) increases uplink (UL) efficiency and throughput. H-ARQ and Node-B scheduling is part of the EU. Similar to an HSDPA, a new shared DL control channel for EU operation provides fast and dynamic allocation of UL radio resources for UL transmissions. The shared DL control channel for the EU needs to ensure low allocation latencies and efficient radio resources management for UL transmissions. Hereinafter, the shared DL control channel for the purposes of an EU is simply referred to as a UL resource assignment channel.

In order to implement an EU along with an HSDPA, another UL resource assignment channel for the EU could be introduced on top of an existing HS-SCCH for an HSDPA. Thus, it is possible to introduce a separate set of SF=128 DL channels as UL resource assignment channels. With this approach, a WTRU would be required to monitor one or more UL resource assignment channels in addition to the HS-SCCHs for an HSDPA operation. Although this approach is conceptually simple, there are many disadvantages with this scheme, such as WTRU complexity, WTRU battery efficiency, and DL spreading code usage.

Therefore, an efficient EU channel assignment scheme is necessary for supporting both an EU and an HSDPA operation.

SUMMARY

In one embodiment, the present invention is a method and wireless communication system for providing channel assignment information for supporting a UL channel and a DL channel. The system includes at least one Node-B and at least one WTRU. The WTRU communicates with the Node-B via a common control channel, the UL channel and the DL channel. The WTRU receives a message from the Node-B via the common control channel. The message includes an indication of whether the message is intended for assigning radio resources to the UL channel or the DL channel. The WTRU determines whether the message is intended for the WTRU and, if so, the WTRU determines whether the message is for assigning radio resources to the UL channel or the DL channel. The WTRU takes an appropriate action based on whether the message is for assigning radio resources to the UL channel or the DL channel.

In another embodiment, the present invention is a method and time-slotted wireless communication system. The system includes at least one Node-B, a radio network controller (RNC) which controls the Node-B, and at least one WTRU which communicates with the Node-B via a common control channel, a UL channel and a DL channel. The RNC transmits a message to the WTRU indicating which time slot TTIs support UL channel transmissions and which time slot TTIs support DL channel transmissions.

BRIEF DESCRIPTION OF THE DRAWINGS

A more detailed understanding of the invention may be had from the following description of a preferred example, given by way of example and to be understood in conjunction with the accompanying drawing wherein.

DETAILED DESCRIPTION OF THE PREFERRED EMBODIMENTS

The present invention will be described with reference to the drawing figures wherein like numerals represent like elements throughout.

Hereafter, the terminology "WTRU" includes but is not limited to a user equipment, a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The present invention is applicable to any type of wireless communication systems such as UMTS-time division duplex (TDD) and FDD, time division synchronous code division multiple access (TDSCDMA), code division multiple access 2000 (CDMA 2000), and CDMA in general or any other type of wireless communication system.

The features of the present invention may be incorporated into an integrated circuit (IC) or be configured in a circuit comprising a multitude of interconnecting components.

The present invention will be described in reference to an HSDPA and an EU, and the terms HSDPA and EU are used interchangeably with DL and UL, respectively. However, it should be understood that the reference to an HSDPA and an EU is just for describing the preferred embodiment of the present invention, and the teachings of the present invention may be applied to any system for utilizing a common control channel for transmitting channel assignment information for both UL and DL transmissions simultaneously.

Figure 1:
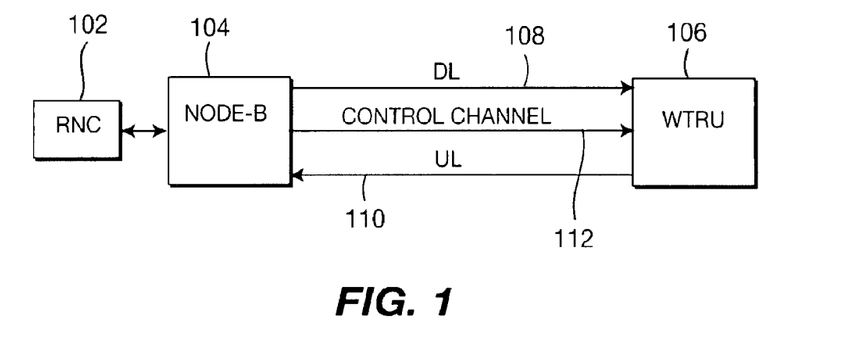
FIG. 1 is a block diagram of a wireless communication system operating in accordance with the present invention.

FIG. 1 is a block diagram of a system 100 for supporting UL and DL operations in accordance with the present invention. The system 100 includes an RNC 102, a Node-B 104, and a WTRU 106. The Node-B 104 is controlled by the RNC 102, and dynamically allocates radio resources for both UL and DL transmissions from and to the WTRU 106. Three channels are established between the Node-B 104 and the WTRU 106. The channels are a DL channel 108, a UL channel 110, and a common control channel 112. The common control channel 112 is utilized for transmission of channel assignment information for both UL and DL transmissions.

The Node-B 104 is configured to support an HSDPA and EU operation. Therefore, each Node-B 104 dynamically allocates radio resources for DL and UL transmissions to and from the WTRU 106 through an HS-DSCH and an EU channel, respectively. The radio resources assignment information for both the HS-DSCH and the EU is transmitted through the common control channel 112.

In accordance with the present invention, the common control channel 112 is utilized for the transmission of radio resources assignment information for both UL and DL transmissions and a specific indication is provided to distinguish whether the radio resource assignment is for either UL or DL transmission. Therefore, the common control channel 112 occupies a shared DL radio resource space, as defined by a set of SF=128 channelization codes, for both DL and UL transmissions simultaneously, and the WTRU 106 is configured to recognize whether a particular transmission is intended for assigning radio resources for the DL or the UL transmissions.

Figure 2:
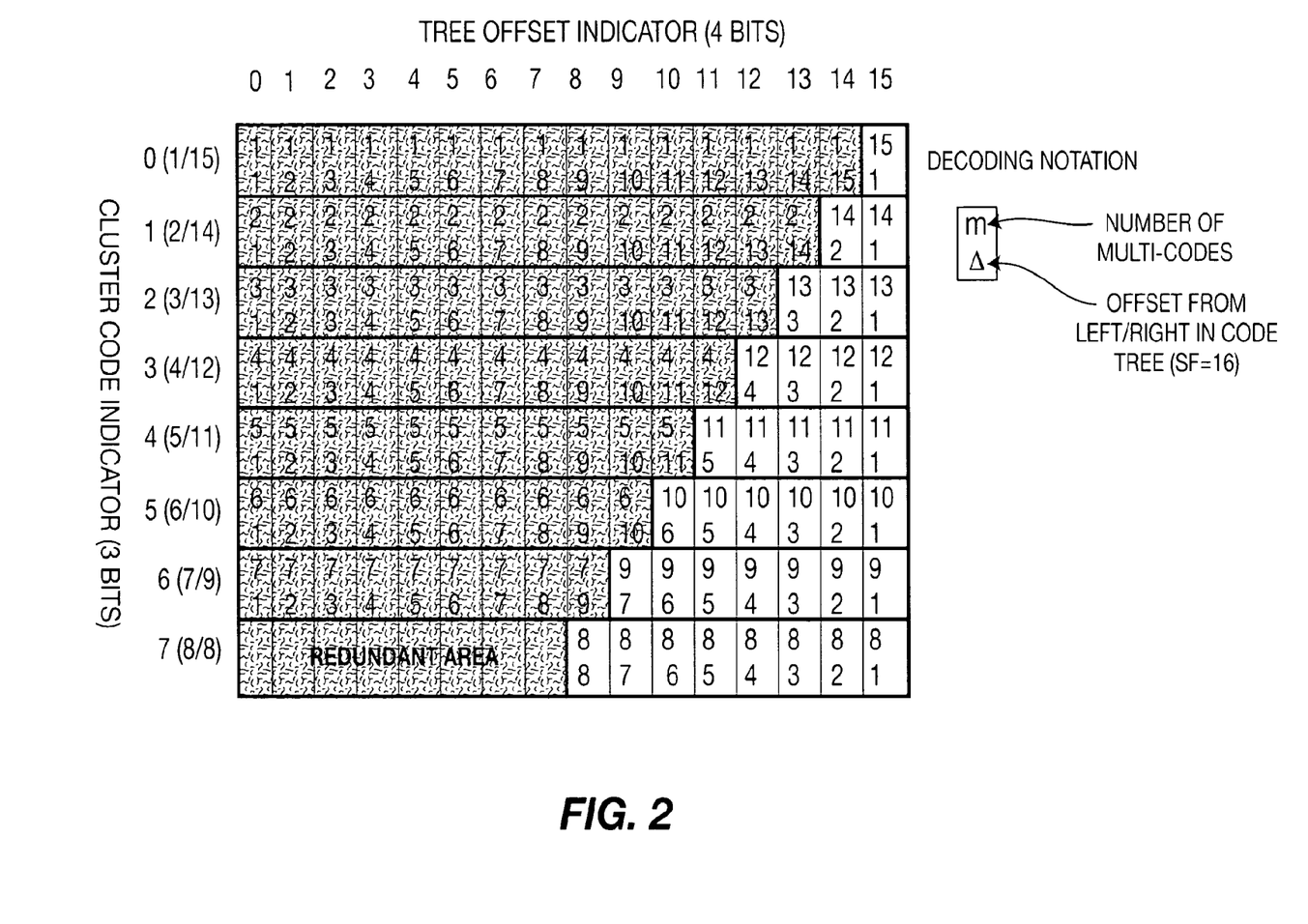
FIG. 2 is a look-up table for channelization code set mapping in an HSDPA, which is utilized in conjunction with the system of FIG. 1.

In accordance with a first embodiment of the present invention, an indication that a particular radio resource is assigned for a UL transmission is provided by means of one or more of the impossible combinations in the channelization code set mapping in a current HSDPA. FIG. 2 is a look-up table for channelization code set mapping currently used in the HSDPA. An HS-SCCH uses seven (7) bits to inform the WTRU 106 which SF=16 channelization codes are used for the corresponding HS-DSCH. Out of the 128 possible combinations, eight (8) combinations are not currently used in an HSDPA (see the labeled "redundant area" in FIG. 2). One or more of the eight (8) unused combinations is used for assigning radio resources or indicating that the demodulated transmission is for UL transmission, not DL transmission. Therefore, if the WTRU 106 determines that a channelization-code-set corresponds to one of the impossible combinations of FIG. 2, the WTRU 106 recognizes that the transmission is for assignment of radio resources for UL transmission, rather than DL transmission, or that the codes corresponding to the channelization-code-set are assigned to UL transmissions.

In accordance with a second embodiment of the present invention, an indication that a particular radio resource is assigned for UL transmission is provided by means of a WTRU-specific CRC. Under current HSDPA specifications, a WTRU-specific CRC is contained in an HS-SCCH field 2. A 16-bit CRC is computed from the information to be transmitted, and the computed CRC is masked with a unique 16-bit WTRU identity (ID). The masked CRC is transmitted to a WTRU 106 as a WTRU-specific CRC.

In accordance with the second embodiment of the present invention, this WTRU- specific CRC is modified in a unique and deterministic way to indicate that the demodulated transmission is for UL transmission, rather than DL transmission. For example, a WTRU-specific CRC computed for an HSDPA is inverted for an EU before performing a channel coding. A WTRU 106 performs two (2) different comparisons, preferably simultaneously, in performing a CRC of the received transmission. If the WTRU 106 succeeds in decoding the received transmission with a WTRU-specific CRC, the WTRU 106 recognizes that the transmission is intended for an HSDPA, and if the WTRU 106 succeeds in decoding the received transmission with an inverted WTRU-specific CRC, the WTRU 106 recognizes that the transmission is intended for an EU.

In accordance with a third embodiment of the present invention, an indication that a particular radio resource is assigned for an EU is provided by means of a WTRU-specific masking sequence. Under current HSDPA specifications, a 40-bit sequence of field 1 is masked with a 40-bit WTRU-specific intermediate code sequence which is generated from a 16-bit WTRU ID.

In accordance with the third embodiment, the WTRU-specific masking on field 1 is modified in a unique and deterministic way to indicate that a transmission is intended for an EU, not for an HSDPA. For example, the inverted 16-bit CRC generated in the second embodiment may be used to derive the 40-bit long masking sequence. If the WTRU 106 succeeds in decoding the received transmission with a WTRU-specific masking sequence, the WTRU 106 recognizes that the transmission is intended for an HSDPA, and if the WTRU 106 succeeds in decoding the received transmission with an inverted WTRU-specific masking sequence, the WTRU 106 recognizes that the transmission is intended for an EU.

With this method, the WTRU 106 can make the distinction whether an EU or an HSDPA channel assignment has been transmitted after having received only field 1 of the HS-SCCH transmission.

Alternatively, WTRU IDs are allocated by the network in such a way that a particular WTRU ID does not collide with another WTRU ID. For example, a first WTRU's inverted ID for EU may be used to indicate a second WTRU's HSDPA service. Therefore, simultaneous detection of presence of a UL resource assignment channel and an HS-SCCH is facilitated.

In accordance with a fourth embodiment of the present invention, an indication that a particular radio resource is assigned for an EU is provided by means of radio resource control (RRC) context signaling. Preferably, a Node-B 104 allocates separate radio resources for transmission of UL radio resources assignment and DL radio resources assignment. Alternatively, an RNC 102 allocates separate radio resources for transmission of UL radio resources assignment and DL radio resources assignment by using RRC signaling messages.

For example, an RRC signaling message from the RNC 102 may inform a WTRU 106 in which TTIs to expect an HS-SCCH or a UL resource assignment channel. Under current R5 HSDPA specifications, fifteen (15) time slots include one (1) frame, and three (3) time slots include one (1) TTI. "Even" TTIs may include, for example, time slots 2, 4, 6, 8, 10, 12 and 14, and "odd" TTIs may include, for example, time slots 1, 3, 5, 7, 9, 11, 13 and 15.

In accordance with the present invention, an RRC transmits signals indicating that a transmission in "even" TTIs is for an HS-SCCH and a transmission in "odd" TTIs is for a UL resource assignment channel. By not allowing a transmission for an HS-SCCH to be transmitted in "odd" TTIs, backwards compatibility with R5 WTRUs can be ensured. The same set of SF=128 resources can be used for an HS-SCCH and a UL resource assignment channel.

In accordance with a fifth embodiment of the present invention, an indication that a particular radio resource is assigned for an EU is provided by means of layer 1 indication on an associated DL dedicated channel (DCH). One or more bits on the associated DL DCH are used to indicate imminent occurrence of a UL resource assignment channel as opposed to an HS-SCCH by means of a fixed and pre-determined timing relationship.

Figure 3:
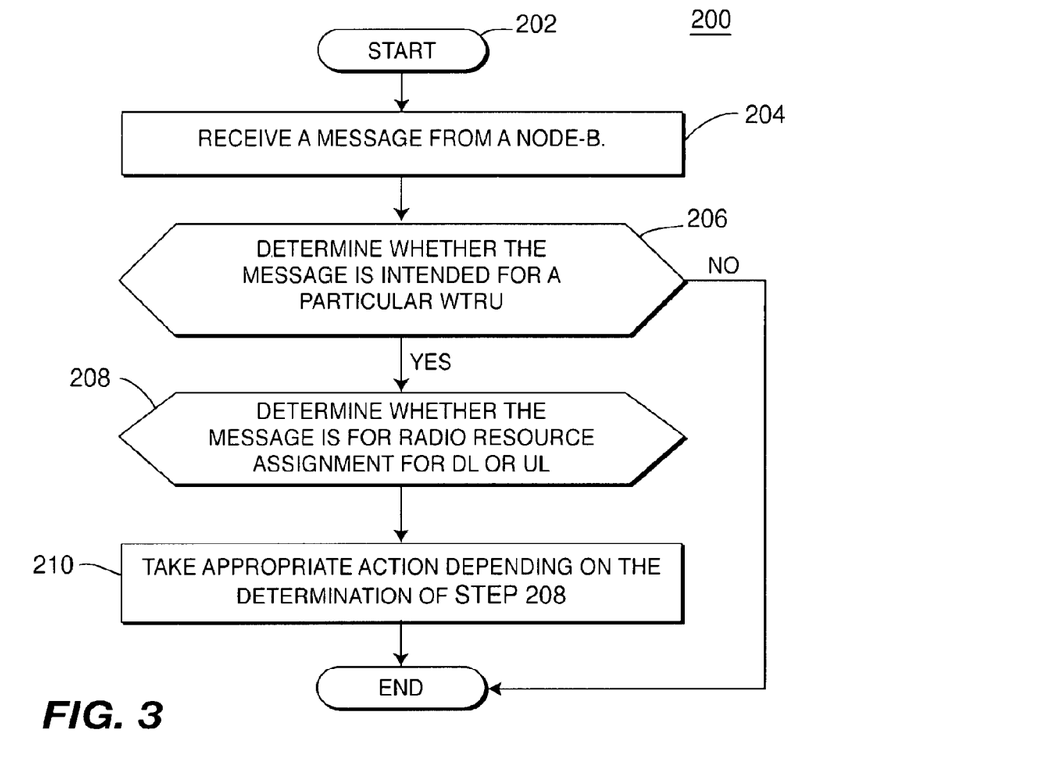
FIG. 3 is a flowchart of a process including method steps for implementing uplink channel assignment signaling in accordance with the present invention.

FIG. 3 is a flowchart of a process 200 including method steps for implementing UL channel assignment signaling in accordance with the present invention. After the process 200 is initiated (step 202), a message for radio resource assignment is transmitted via a common control channel from a Node-B 104 to a WTRU 106. The WTRU 106 receives and demodulates the message using predetermined codes every predetermined TTI, for example, every 2 ms (step 204). The WTRU 106 then determines if the message is intended for the WTRU 106 (step 206). A WTRU-specific CRC may be utilized for this purpose. If the WTRU 106 determines that the message is intended for the WTRU 106, the WTRU 106 determines whether the message is for the assignment of radio resources for DL transmission or UL transmission implementing one of the embodiments of the present invention described above (step 208). The WTRU 106 then takes appropriate actions (step 210) depending on the decision in step 208 to receive or transmit data packet via DL or UL channels. For example, the WTRU 106 may recognize exactly when to initialize a data reception procedure via the DL channel 108 or when to initialize a data transmission procedure via the UL channel 110. Currently, an HS-SCCH for an HSDPA announces an incoming data packet for the WTRU with a fixed two (2) slot offset, whereas the present invention can inform the WTRU when it has an opportunity to transmit a packet via the UL, (e.g., four slots from now).

While this invention has been particularly shown and described with reference to preferred embodiments, it will be understood by those skilled in the art that various changes in form and details may be made therein without departing from the scope of the invention described hereinabove.

What is claimed is:

1. A method for utilizing channel control information associated with enhanced uplink (EU) transmission, implemented by a wireless transmit/receive unit (WTRU), the method comprising:
   receiving information via radio resource control (RRC) signaling;
   receiving downlink (DL) control information for at least EU transmission in at least one time slot, wherein the DL control information is at least a first type or a second type, and wherein the DL control information of the first type and the DL control information of the second type are received via a same channel, and wherein the DL control information is masked with a forty bit WTRU specific code sequence;
   determining whether the DL control information is intended for the WTRU based at least upon the forty bit WTRU specific code sequence received in the at least one time slot and the information received via RRC signaling;
   determining that the DL control information is the first type or the second type based upon the forty bit WTRU specific code sequence and the information received via RRC signaling; and
   utilizing the DL control information of the first type or the second type for at least EU transmission on a condition that the DL control information is intended for the WTRU.

2. The method of claim 1 wherein the same channel is a channel that uses a same channelization code.

3. The method of claim 1 wherein the same channel is a code channel.

4. The method of claim 1 wherein the DL control information includes hybrid automatic repeat request (H-ARQ) information.

5. The method of claim 1 wherein the DL control information includes EU radio resource assignment information.

6. The method of claim 1 wherein the DL control information is received from a Node-B.

7. The method of claim 1 wherein the information received via RRC signaling is from a radio network controller (RNC).

8. A wireless transmit/receive unit (WTRU) comprising:
   circuitry configured to receive information via radio resource control (RRC) signaling;
   circuitry configured to receive downlink (DL) control information for at least enhanced uplink (EU) transmission in at least one time slot, wherein the DL control information is at least a first type or a second type, and wherein the DL control information of the first type and the DL control information of the second type are received via a same channel, and wherein the DL control information is masked with a forty bit WTRU specific code sequence;
   circuitry configured to determine whether the DL control information is intended for the WTRU based at least upon the forty bit WTRU specific code sequence received in the at least one time slot and the information received via RRC signaling;
   circuitry configured to determine that the DL control information is the first type or the second type based upon the forty bit WTRU specific code sequence and the information received via RRC signaling; and
   circuitry configured to utilize the DL control information of the first type or the second type for at least EU transmission on a condition that the DL control information is intended for the WTRU.

9. The WTRU of claim 8 wherein the same channel is a channel that uses a same channelization code.

10. The WTRU of claim 8 wherein the same channel is a code channel.

11. The WTRU of claim 8 wherein the DL control information includes hybrid automatic repeat request (H-ARQ) information.

12. The WTRU of claim 8 wherein the DL control information includes EU radio resource assignment information.

13. The WTRU of claim 8 wherein the DL control information is received from a Node-B.

14. The WTRU of claim 8 wherein the information received via RRC signaling is from a radio network controller (RNC).

* * * * *